United States Patent
Linnell et al.

(10) Patent No.: US 10,987,812 B1
(45) Date of Patent: Apr. 27, 2021

(54) ERROR ACCRUAL AND MITIGATION DURING ROBOTIC PROCESS

(71) Applicant: X Development LLC, Mountain View, CA (US)

(72) Inventors: Jeff Linnell, Woodside, CA (US); Anthony Jules, Oakland, CA (US); Marek Michalowski, San Francisco, CA (US); Kendra Byrne, Mountain View, CA (US); Jonathan Proto, San Francisco, CA (US); Brandon Kruysman, San Francisco, CA (US); Eli Reekmans, San Francisco, CA (US); Matthew Bitterman, Mountain View, CA (US); Michael Beardsworth, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 297 days.

(21) Appl. No.: 16/154,923

(22) Filed: Oct. 9, 2018

Related U.S. Application Data

(63) Continuation of application No. 15/222,568, filed on Jul. 28, 2016, now abandoned.

(51) Int. Cl.
*B25J 9/16* (2006.01)
*E04G 21/22* (2006.01)
(Continued)

(52) U.S. Cl.
CPC .......... *B25J 9/1692* (2013.01); *B25J 9/1669* (2013.01); *B25J 9/1687* (2013.01); *E04G 21/22* (2013.01);
(Continued)

(58) Field of Classification Search
CPC ...... B25J 9/1692; B25J 9/1687; B25J 9/1669; G05B 17/02; G05B 19/4063;
(Continued)

(56) References Cited

U.S. PATENT DOCUMENTS 5,325,468 A * 6/1994 Terasaki ................. B25J 9/1661
700/262
6,237,210 B1 * 5/2001 Stoewer .................... B64C 1/00
29/243.53

(Continued)

OTHER PUBLICATIONS

International Search Report and Written Opinion issued in International Application No. PCT/US2017/044076, dated Dec. 6, 2017, 17 pages.

(Continued)

*Primary Examiner* — Jason Holloway
(74) *Attorney, Agent, or Firm* — Fish & Richardson P.C.

(57) ABSTRACT

A robotic system includes end-effector(s) that combine a plurality of objects in a production process. The system includes sensor(s) that obtain measurement(s) relating to a combination of a first object and one or more other objects during the production process. The system includes a control system communicatively coupled to the sensor(s). The control system stores specifications relating to the combination of the plurality of objects. The control system receives the measurement(s) from the sensor(s), determines a difference based on the measurement(s) and the specifications, determines adjustment(s) to the production process based on the determined difference, and sends, for the end-effector(s), instruction(s) based on the specifications and the one or more adjustment(s). The end-effector(s) combine a second object with the first object and the one or more objects based on the specifications and the one or more adjustment(s).

20 Claims, 12 Drawing Sheets

(51) Int. Cl.
*G05B 19/4063* (2006.01)
*G05B 17/02* (2006.01)

(52) U.S. Cl.
CPC ......... *G05B 17/02* (2013.01); *G05B 19/4063* (2013.01); *G05B 2219/39024* (2013.01); *G05B 2219/45086* (2013.01)

(58) Field of Classification Search
CPC ........... G05B 2219/45086; G05B 2219/39024; E04G 21/22
See application file for complete search history.

(56) References Cited

U.S. PATENT DOCUMENTS

| | | | | |
|---|---|---|---|---|
| 8,888,434 | B2 * | 11/2014 | Rebstock | H01L 21/67769 414/281 |
| 2005/0196484 | A1 * | 9/2005 | Khoshnevis | B28B 1/001 425/463 |
| 2009/0038258 | A1 * | 2/2009 | Pivac | B25J 9/162 52/749.14 |
| 2011/0288667 | A1 * | 11/2011 | Noda | G05B 19/42 700/98 |
| 2012/0180424 | A1 * | 7/2012 | Hinshaw | E04G 21/26 52/745.02 |
| 2014/0283357 | A1 * | 9/2014 | Harada | B23P 21/004 29/430 |
| 2015/0082740 | A1 * | 3/2015 | Peters | B25J 11/00 52/747.12 |
| 2015/0336272 | A1 * | 11/2015 | Drew | B32B 37/1284 156/64 |
| 2017/0235300 | A1 * | 8/2017 | Maruno | G05B 19/4182 700/112 |
| 2017/0254102 | A1 * | 9/2017 | Peters | E04G 21/22 |

OTHER PUBLICATIONS

International Search Report and Written Opinion issued in International Application No. PCT/US2017/044095, dated Dec. 4, 2017, 15 pages.

* cited by examiner

ERROR ACCRUAL AND MITIGATION DURING ROBOTIC PROCESS

CROSS REFERENCE TO RELATED APPLICATION

This application is a continuation of U.S. application Ser. No. 15/222,568, filed Jul. 28, 2016, the contents of which are incorporated by reference herein.

BACKGROUND

A robot may include one or more end-effectors that allow the robot to manipulate objects and one or more sensors that guide the manipulation of the objects. For example, a robot can use the end-effector(s) and sensor(s) to combine a plurality of objects into a desired physical structure.

SUMMARY

To produce a physical structure from a plurality of physical objects, a robotic system may be guided by specifications that are generated from a model for the physical structure. The actual production process, however, might introduce variations/errors that may affect the final physical structure produced. According to aspects of the present disclosure, however, the robotic system can monitor each step of the production process and dynamically determine how to mitigate the effect of any variations/errors that may be introduced at each step. Specifically, the robotic system can employ sensors to take measurements after each step in the production process. Using these measurements, a control system of the robotic system can identify any variations/errors and evaluate whether the production process will produce the desired physical structure. The specifications derived from the model provide the robotic system with the necessary flexibility to customize the production process so that the desired physical structure is produced. The specifications define a flexible design space where different parameters in the production process can be modified to accommodate physical reality. Although the adjustments to the production process may change aspects of the resulting physical structure, the robotic system operates so that the production process preserves the intent of the designer as set forth in the model.

According to an example embodiment, a robotic system includes a body including one or more end-effectors configured to combine a plurality of objects in a production process. The system includes one or more sensors configured to obtain one or more measurements relating to the combination of the plurality of objects during the production process. The system includes a control system including one or more processors and one or more data storage devices. The control system is communicatively coupled to the one or more sensors. The one or more data storage devices store specifications relating to the combination of the plurality of objects. The control system is configured to: receive, from the one or more sensors, one or more first measurements relating to a combination of a first object and one or more other objects during the production process; determine a difference based on the one or more first measurements and the specifications; determine one or more adjustments to the production process based on the determined difference; and send, for the one or more end-effectors, one or more instructions based on the specifications and the one or more adjustments to the production process. The one or more end-effectors, in response to the one or more instructions, combines a second object with the first object and the one or more other objects based on the specifications and the one or more adjustments to the production process.

According to another example embodiment, a method for a robotic system includes combining, with one or more end-effectors, a first object and one or more other objects during a production process. The method includes obtaining, with one or more sensors, one or more measurements relating to combining the first object and the one or more other objects during the production process. The method includes storing, on one or more data storage devices, specifications for a combination of a plurality of objects. The method includes determining, with a control system including one or more processors, a difference based on the one or more measurements and the specifications. The method includes determining, with the control system, one or more adjustments to the production process based on the determined difference. The method includes combining, with the one or more end-effectors, a second object with the first object and the one or more other objects based on the specifications and the one or more adjustments to the production process.

According to yet another embodiment, a method for a robotic system includes storing, on one or more data storage devices, a model for combining a plurality of objects. The method includes combining a first set of the objects. The method includes obtaining, with one or more sensors, one or more measurements relating to the combination of the first set of the objects. The method includes determining, with a control system implemented with one or more processors, one or more differences based on the model and the one or more measurements. The method includes determining, with the control system, one or more adjustments based on the one or more differences. The method includes combining, with one or more end effectors, a second set of the physical objects with the first set of objects based on the model and the one or more determined adjustments.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
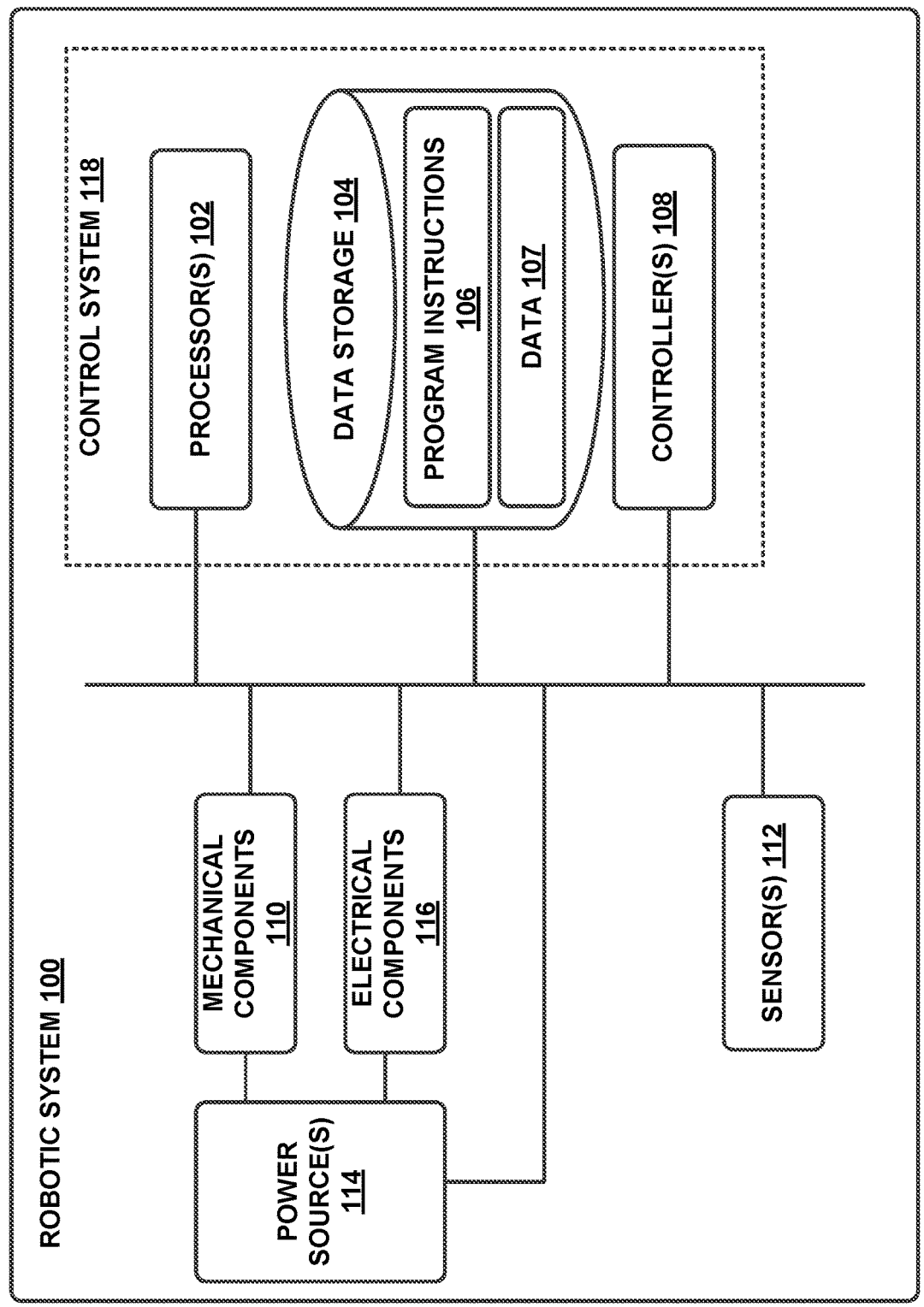
FIG. 1 illustrates an example configuration of a robotic system according to aspects of the present disclosure.

The following detailed description describes various features and functions of the disclosed systems and methods with reference to the accompanying figures. The illustrative system and method embodiments described herein are not meant to be limiting. It will be readily understood that certain aspects of the disclosed systems and methods can be arranged and combined in a wide variety of different configurations, all of which are contemplated herein.

I. Overview

A robot may include one or more end-effectors that allow the robot to manipulate or otherwise engage physical objects and one or more sensors that guide the manipulation of the physical objects. A robot can use the end-effector(s) and sensor(s) to combine a plurality of physical objects into a desired physical structure. According to one example, the desired physical structure may be an airplane wing and the physical objects are the components, such as spars, ribs, and sheet metal, that are combined to produce the airplane wing.

To produce this physical structure, the robot may be guided by specifications that are generated from a model for the physical structure. The model may provide a designer's conception of how the physical structure will be configured and how it will perform when actually produced by the robot. To develop the model, the designer may define a plurality of model objects, which may provide the designer's conception of what physical objects are combined to produce the physical structure. The designer designs each model object to contribute an appropriate set of properties that helps the physical structure provide the desired configuration and performance.

The designer also defines relationships between the model objects. These relationships determine how the model objects are combined for the physical structure. For instance, these relationships may determine positions/orientations of the model objects relative to other model objects. In addition, these relationships may determine how the model objects are directly or indirectly coupled to each other. Furthermore, these relationships may determine what manufacturing, assembly, or other production techniques to employ to combine the model objects.

The designer may further define aspects of the model according to a model production site. The model production site models external structures and conditions at the production site where the physical structure will be produced. The designer may also determine relationships between the the model objects and aspects of the model production site.

In the example above, the designer may develop a model that provides an engineer's conception of how spars, ribs, sheet metal, and other components can be combined to produce the airplane wing. The designer models spars, ribs, sheet metal, and other components to have the desired properties for the airplane wing. In addition, the designer models the relationships between the spars, ribs, sheet metal, and other components, indicating for instance how they are positioned/oriented relative to each other, how they are coupled to each other, and how they are assembled together according to different production techniques. Furthermore, the designer may model aspects of the factory floor that may affect the production of the airplane wing, including for instance temperature and humidity that may affect the components and the production techniques.

Ideally, the robot produces a physical structure that closely resembles the model as initially conceived by the designer. However, the actual production process might introduce variations/errors that may affect the final physical structure.

When developing the model, the designer may attempt to make the production process for the physical structure more robust by providing tolerances for acceptable variations introduced by the production process. For instance, the model may include tolerances for small variations in the position or orientation of each physical object. Even when the robot installs the physical objects with variations within the tolerances, however, such variations may accumulate to create an unanticipated effect on the final physical structure. Furthermore, the robot may install one or more of the physical objects with errors outside of the tolerances. In general, the robot may encounter production issues that cannot be sufficiently addressed by the tolerances.

Advantageously, the robot can monitor each step of the production process. For instance, the robot can take various measurements of variations/errors within the three-dimensional space of the actual production site. The robot can then determine the effect of the variations/errors on the final physical structure. With the feedback provided by such measurements, the robot can dynamically determine how to mitigate the effect of any variations/errors that may be introduced at each step. In some cases, the robot may decide to abort the production process. In other cases, the robot can dynamically address the effect of variations/errors by determining adjustments for the production process. By allowing the robot to respond to the variations/errors on its own, the production process can continue without interruption and/or intervention by operators or the like.

In the example above, the robot may take three-dimensional measurements of the airplane wing's size and shape as the production process progresses. From these measurements, the robot can identify differences, i.e., variations/errors, between the actual airplane wing and the model. The robot can assess these differences to decide whether the production process can still produce the desired airplane wing. If necessary, the robot can adjust the production process to account for the differences and produce the desired airplane wing. If adjustments cannot overcome the differences, the robot can abort the production process.

Although the adjustments to the production process may change aspects of the resulting physical structure, the robot operates so that the production process preserves the intent of the designer as set forth in the model. In other words, the robot can customize the production process to address issues in the production process while still producing a physical structure generally consistent with the model.

In general, parameters of the model have modifiable values, settings, etc. As such, the specifications provide a parameter space that allows for adjustments. In other words, the adjustments select values, settings, etc., for one or more of the parameters of the model in response to the variations/errors. The selection of these values, settings, etc., can optimize the parameter space for the model.

When developing the model, the designer may define one or more constraints that establish the scope of allowable adjustments to the production process. The specifications communicated to the robot also include information on the constraints. In particular, the constraints establish the parameter space for the adjustments. The constraints may include features that are most significant to the designer and indicate the designer's intent behind the model. The robot can evaluate the constraints to determine how to customize the production process for the physical structure.

After evaluating a variation/error resulting from the installation of one of the physical objects, the robot might determine that one or more constraints cannot be satisfied even if the production process is modified. In such cases, the robot can abort the production process. In other words, the robot can make a "go/no go" decision after the installation of each physical object.

When developing the model, the designer may also define respective weightings for the constraints. With the weightings, the specifications can further guide customization of the production process. The robot can evaluate the weightings to determine a preferred approach that yields a physical structure most consistent with the designer's intent. For instance, the constraints may be weighted to indicate the relative importance that the designer places on each constraint. The weightings may indicate that some constraints must be satisfied. Meanwhile, the weightings may indicate that other constraints are preferences which may be modified (or even ignored) in order to produce the desired physical structure. Furthermore, the weightings may indicate the order in which modifiable constraints should be modified, i.e., which preferences have higher priority.

In the example above, the designer of the airplane wing may define constraints that require the airplane wing to have a certain aerodynamic profile that falls within a practical range of profiles. The designer may also define constraints based on safety regulations. If necessary, the robot can then make adjustments to the production process to account for the accrual of variations/errors during the production process as long as the final airplane wing is produced according to the constraints and their respective weightings.

II. Example Robotic System

FIG. 1 illustrates an example configuration of a robotic system 100 that may be used in connection with the embodiments described herein. The robotic system 100 may be configured to operate autonomously, semi-autonomously, and/or using directions provided by user(s). The robotic system 100 may be implemented in various forms, such as a biped robot, quadruped robot, a robotic arm, or some other arrangement. Furthermore, the robotic system 100 may also be referred to as a robot, robotic device, or mobile robot, among other designations. Generally, the robotic system 100 provides a device that has a computing ability and can interact with its surroundings with an actuation capability and/or with ability to emit/generate physical phenomena such as light and/or sound, among others.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. The robotic system 100 is shown for illustrative purposes, and may include more or fewer components. The various components of the robotic system 100 may be connected in any manner, including wired or wireless connections. Further, in some examples, components of the robotic system 100 may be distributed among multiple physical entities rather than a single physical entity. Other example embodiments of the robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by the processor(s) 102. The one or more computer-readable storage media can include volatile and/or non-volatile storage components, such as optical, magnetic, organic, or another type of memory or storage, which can be integrated in whole or in part with the processor(s) 102. In some embodiments, the data storage 104 can be a single physical device. In other embodiments, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks) interface between any combination of the mechanical components 110, the sensor(s) 112, the power source(s) 114, the electrical components 116, the control system 118, and/or a user of the robotic system 100. In some embodiments, the controller 108 may be a purpose-built embedded device for performing specific operations with one or more subsystems of the robotic device 100

The control system 118 may monitor and physically change the operating conditions of the robotic system 100. In doing so, the control system 118 may serve as a link between portions of the robotic system 100, such as between the mechanical components 110 and/or the electrical components 116. In some instances, the control system 118 may serve as an interface between the robotic system 100 and another computing device.

During operation, the control system 118 may communicate with other systems of the robotic system 100 via wired or wireless connections, and may further be configured to communicate with one or more users of the robotic system 100. As one possible illustration, the control system 118 may receive an input (e.g., from a user or from another robot) indicating an instruction to perform a particular action.

A wired connection in the robotic system 100 may include, for example, a parallel bus or a serial bus such as a Universal Serial Bus (USB). Meanwhile, a wireless connection in the robotic system 100 may include, for example, Bluetooth, IEEE 802.11 (such as IEEE 802.11-2007, IEEE 802.11n-2009, or any other IEEE 802.11 revision), cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (such as CDMA, GSM, or WiMAX, as well as "WiFi" connectivity using IEEE 802.11).

The robotic system 100 may include access points through which the control system 118 may communicate with a cloud server or other network resource. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

Further, the control system 118 may serve as an interface between the robotic system 100 and a user. For instance, the control system 118 may include various components for communicating with the robotic system 100. The example interfaces and communications may be implemented via a wired or wireless connection, or both.

The control system 118 may include an input/output unit. The input/output unit may output information to a user through a display. The display may take on any form and may be arranged to project images and/or graphics to a user of the control system 118. As such, the display may show a graphical user interface (GUI) that may provide an application through which the user may interact with the systems disclosed herein.

Additionally, the input/output unit may receive user-input (e.g., from the user of the control system 118). In particular, the input/output unit may allow for interaction with the GUI such as for scrolling, providing text, and/or selecting various features of the application, among other possible interactions. The input/output unit may take on various forms. In one example, the input/output unit may include a pointing device such as a computing mouse used for control of the GUI. However, if the input/output unit includes a touch screen display, touch-input can be received (e.g., such as using a finger or a stylus) that allows for control of the GUI. In another example, the input/output unit may include a keyboard that provides for selection of numbers, characters and/or symbols to be displayed via the GUI. For instance, in the arrangement where the input/output unit includes a touch screen display, portions the display may show the keyboard. Thus, touch-input on the portion of the display including the keyboard may result in user-input such as selection of specific numbers, characters, and/or symbols to be shown on the GUI through the display. In yet another example, the input/output unit may include a voice input device that receives audio input, such as from a user through a microphone, that is then interpretable using one of various speech recognition techniques into one or more characters that may be shown through the display. Other examples may also be possible.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that enable the robotic system 100 to perform physical operations. As a few examples, the mechanical components 110 may include physical members such as leg(s), arm(s), and/or wheel(s).

The physical members or other parts of robotic system 100 may further include actuators arranged to move the physical members in relation to one another. An actuator is a mechanism that may be used to introduce mechanical motion. An actuator may be configured to convert stored energy into movement of one or more components. Various mechanisms may be used to power an actuator. For instance, actuators may be powered by chemicals, compressed air, hydraulics, or electricity, among other possibilities. With this arrangement, actuators may cause movement of various movable components of the robotic system 100. For instance, the leg(s) and/or arm(s) may include one or more members connected by joints and configured to operate with various degrees of freedom with respect to one another via actuators.

Furthermore, the mechanical components 110 may include one or more end-effector(s). For instance, an end-effector may be disposed on the end of an arm, which can be operated via actuators to position the end-effector. The end-effector(s) may be employed to perform a task by manipulating objects, acting on loads, etc. For instance, the robotic system 100 may use the end-effector(s) for gripping, turning, carrying, pulling, and/or pushing objects. The end-effector(s) may include hand-like structures with movable fingers. Alternatively or additionally, the end-effector(s) may include other types of appendages or attachments, such as grippers, welding tools, cutting tools, among other possibilities.

The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, legs, and/or end-effectors so that these appendages can be replaced or changed as needed or desired. In some embodiments, the robotic system 100 may include one or more removable and/or replaceable battery units or sensors. Other types of removable components may be included within some implementations.

The robotic system 100 may include the sensor(s) 112 arranged to sense aspects of the robotic system 100. The sensor(s) 112 may include one or more force sensors, torque sensors, velocity sensors, acceleration sensors, gyroscopic sensors, position sensors, proximity sensors, motion sensors, location sensors, load sensors, temperature sensors, thermal imaging sensors, touch sensors (e.g., capacitive sensors), optical sensors, wireless sensors, radio sensors, depth sensors (e.g., RGB-D, laser, structured-light, and/or a time-offlight camera), point cloud sensors, range sensors (e.g., ultrasonic and/or infrared), infrared sensors, object sensors, and/or cameras (e.g., two-dimensional (2D) cameras, color cameras, grayscale cameras, and/or infrared cameras), three-dimensional (3D) scanners, x-ray scanners, spectral scanners, Radio Frequency identification (RFID) systems, Near Field Communication (NFC) chips, among other possibilities. Within some examples, the robotic system 100 may be configured to receive sensor data from the sensor(s) 112 that are physically separated from the robot (e.g., sensors that are positioned on other robots or located within the environment in which the robot is operating). Further, the sensor(s) 112 may be incorporated within existing devices, such as mobile phones, laptops, and/or tablets.

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), a laser tracker system, one or more cameras (e.g., stereoscopic cameras for 3D vision), a global positioning system (GPS) transceiver, and/or other sensors for capturing information of the environment in which the robotic system 100 is operating. The sensor(s) may also include The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or the electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

The robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

III. Example Embodiment of a Robotic System for Producing a Structure

Figure 2:
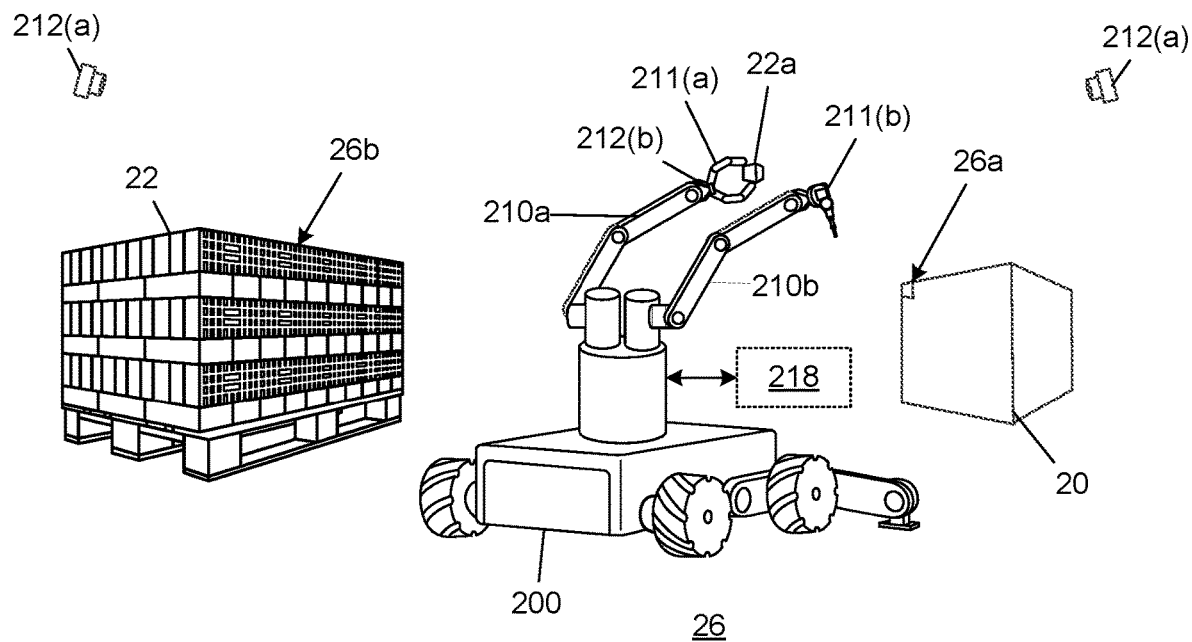
FIG. 2 illustrates an example robot that produces a physical structure at a production site, according to aspects of the present disclosure.

FIG. 2 illustrates a robot 200 that includes aspects of the robotic system 100 described above, such as the mechanical components 110, the sensor(s) 112, the power source(s) 114, the electrical components 116, and/or the control system 118. Operating at a production site 26, the robot 200 works with a plurality of physical objects 22 to produce a physical structure 20.

According to one example, a production site may be a factory floor where a robot installs parts in an assembly line to build a product (e.g., a table, airplane wing, etc.). According to an additional example, a production site may be a work cell, rather than an assembly line, where a robot combines a variety of parts to build a product from start to finish. In these examples, the production site may be a temporary location from which the final physical structure may be delivered (e.g., as a product) to another location (e.g., a distributor or customer location) when completely built.

According to another example, a production site may be a municipal site where a robot works with heavy construction materials to construct a bridge or a road. According to a further example, a production site may be a construction site where a robot works with construction materials to construct a house or a building. According to yet another example, a production site may be the interior of a house where a robot installs housing materials to construct a section of the house. In these examples, the final physical structure is installed in the production site.

As shown in FIG. 2. the robot 200 is configured to complete specific tasks at the production site 26. For instance, the robot 200 may include a variety of end-effectors 211. In particular, an end-effector 211(a) is disposed at the end of an arm 210a that allows the robot 200 to grip a physical object 22a and position the physical object 22a at a specified location 20a at the production site 26. The robot 200 may also include another end-effector 211(b) disposed at the end of another arm 210b that allows the robot 200 to fix or otherwise couple the physical object 22a to a surface at the specified location 20a. For instance, the end-effector 211b may include a tool, such as a nail gun, a glue gun, or welding torch, to fix the physical object 22a in place.

Although FIG. 2 illustrates the single robot 200, the production site 26 may include other robots that work with the robot 200 to produce aspects of the physical structure 20. Each robot at the production site 26 may be configured to complete specific assigned tasks in the production process. Thus, in an alternative example, the robot 200 may be assigned to position the physical object 22a in the specified location 20a, while another robot (not shown) may be assigned to fix the physical object 22a to the specified location 20a with its own end-effector (e.g., nail gun, glue gun, or welding torch).

As shown in FIG. 2, the robot 200 may employ various sensors 212 to guide its operation at the production site 26. The sensors 212 may include local sensors that are directly coupled to the robot 200. Additionally or alternatively, the sensors 212 may include global sensors that are disposed in other areas of the production site 26 separate from the robot 200. For instance, some of the global sensors may be arranged in fixed locations throughout the production site 26. Additionally or alternatively, some of the global sensors may be coupled to other robots at the production site 26.

The sensors 212 may include any of the sensors 112 described above. For instance, to produce the physical structure 20, one or more sensors 212(a) can determine the location of the robot 200 relative to a storage location 20b where the physical objects 22 are stored at the production site 26. The robot 200 can employ data from the one or more sensors 212(a) to move to the location 20b and place the physical objects 22 within range of the end-effector 211(a). Additionally, one or more sensors 212(b) can determine the location of the end-effector 211(a) relative to the physical objects 22, so that the arm 210a can be extended to the retrieve the physical object 22a from the storage location 20b with the end-effector 211(a). With the physical object 22a in the grip of the end-effector 211(a), the one or more sensors 212(a) can then determine the location of the robot 200 relative to the location 20a. The robot 200 can employ data from the one or more sensors 212(a) to move to the position 20a where the physical object 22a is to be fixed in the production process. The one or more sensors 212(b) can then determine the location of the end-effector 211(a) relative to the location 20a, so that the arm 210a can be extended to position the physical object 22a precisely at the location 20a with the end-effector 211(a). As shown in FIG. 2, the one or more sensors 212(a) may be global sensors, while the one or more sensors 212(b) may be local sensors disposed on the arm 210b of the robot 200. The sensors 212(a), (b), however, may be any combination of local and global sensors.

One or more additional sensors 212 may be further employed so that the physical object 22a is manipulated and positioned at the location 22a with a desired orientation. Other sensors 212 may be employed to guide the operation of the end-effector 211(b) to fix the physical object 22a to a surface at the location 20a. Yet other sensors 212 may perform measurements to determine the size and shape of the physical object 22a so that the physical object 22a can be positioned at the location 20a with the appropriate orientation.

A control system 218 is employed to operate the robot 200. The control system 218 may be similar to the control system 118 described above. Aspects of the control system 218 may be included as part of the robot 200 and/or be separate from the robot 200.

The control system 218 can receive data from the sensors 212 via wired and/or wireless connections. The control system 218 can then operate the robot 200 in response to the sensor data. For instance, in the example above, the control system 218 can cause the robot 200 to move to locations 20a, b based on the data from the sensors 212(a) and to manipulate or otherwise engage the physical object 22a based on the data from the sensors 212(b).

IV. Example Model for Producing a Structure with a Robotic System

Figure 3A:
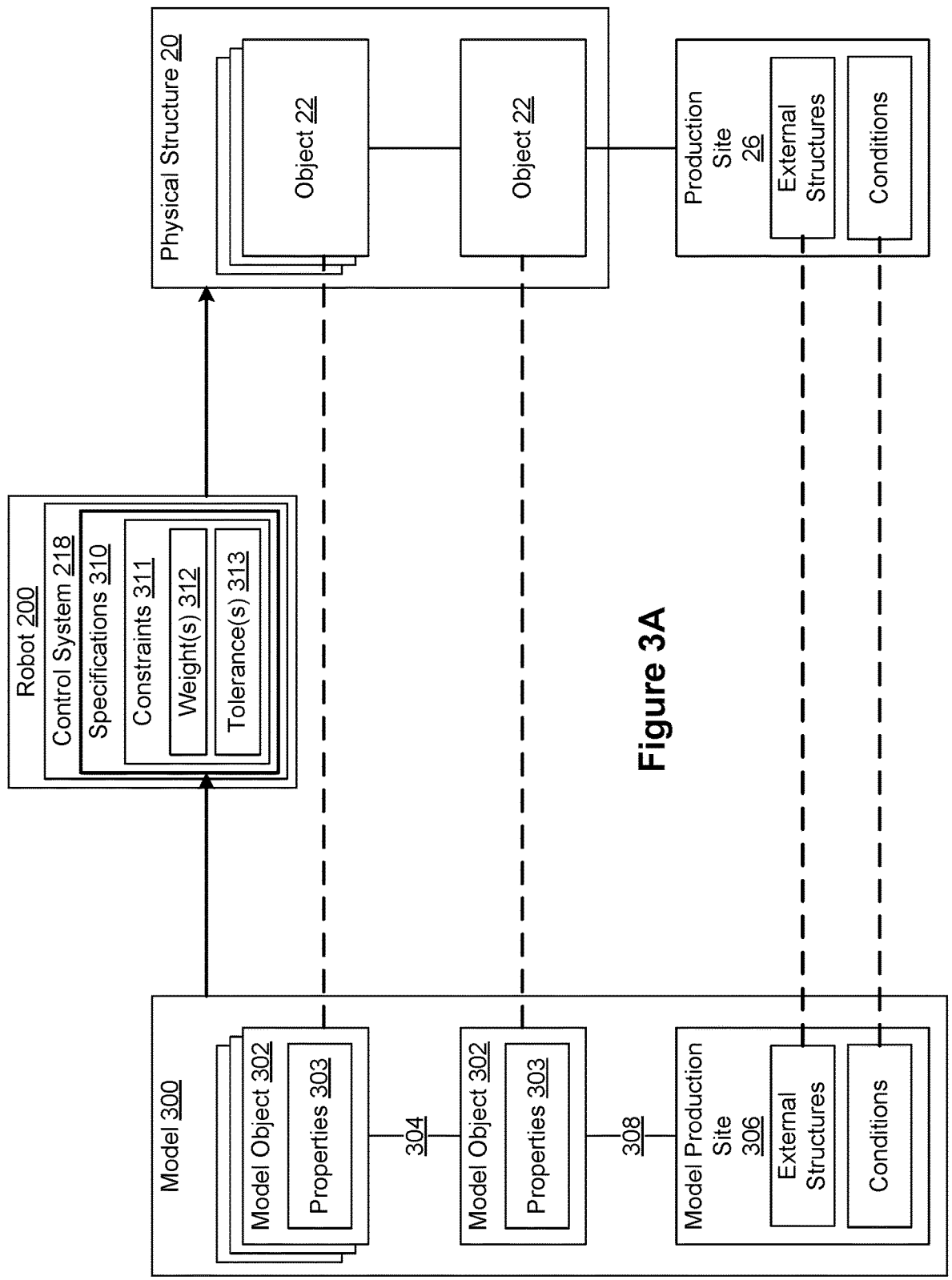
FIG. 3A illustrates an example process for generating specifications from a model and producing a physical structure from the specifications, according to aspects of the present disclosure.

Referring to FIG. 3A, the control system 218 of the robot 200 above is guided by specifications 310 based on a model 300 to produce the physical structure 20 from the plurality of physical objects 22. In particular, the specifications 310 may be embodied as computer-readable program instructions stored on data storage (e.g., data storage 104) of the control system 218. A designer develops the model 300 for the physical structure 20. Generally, the model 300 provides the designer's conception of how the physical structure 20 will be configured and how it will perform when actually produced by the robot 200.

To develop the model 300, the designer defines a plurality of model objects 302. In general, the model objects 302 provide the designer's conception of what physical objects 22 are combined to produce the physical structure 20 according to the model 300. The designer designs each model object 302 to contribute an appropriate set of properties 303 that helps the physical structure 20 to provide the desired configuration and performance. Some of the model objects 302 may share an identical set of properties 303, while other model objects 302 may have different respective sets of properties 303.

The set of properties 303 of each model object 302 may indicate desired aesthetic properties, such as color, markings, visual patterns, shape, size, and surface finish/texture, among other properties. Additionally or alternatively, the set of properties 303 may indicate desired mechanical properties, such as bending strength, brittleness, bulk modulus, coefficient of friction, compressive strength, creep, elasticity, fatigue strength, flexibility, fracture toughness, hardness, plasticity, resilience, shear strength, stiffness, stress/strain properties, surface roughness, tensile strength, toughness, viscosity, yield strength, and weight, among other properties. Additionally or alternatively, the set of properties 303 may indicate electrical and/or magnetic properties, such as capacitance, conductivity, density, dielectric strength, field properties, inductance, permittivity, and resistance, among other properties. Additionally or alternatively, the set of properties 303 may indicate chemical properties, such as corrosion resistance, flammability, pH, reactivity, stability, surface energy/tension, and toxicity, among other properties. Additionally or alternatively, the set of properties 303 may indicate manufacturing properties for coating, cutting, drilling, forming and shaping processes, heat treating, joining, machining, rolling, sanding, and welding, among other techniques. Additionally or alternatively, the set of properties 303 may indicate optical properties, such as absorbance, fluorescence, photosensitivity, reflectivity, refractive index, scattering, and transmittance, among other properties. Additionally or alternatively, the set of properties 303 may indicate thermal properties, such as boiling point, critical point, emissivity, melting point, specific heat, thermal conductivity, thermal diffusivity, and thermal expansion, among other properties.

In some cases, a model object 302 may refer to a stock part with a known set of properties 303. As such, specifying the stock part may be sufficient to communicate the set of properties 303, and it may not be necessary to state the entire set of properties 303 expressly when developing the model 300.

In other cases, a model object 302 may refer to a part that is formed from stock material with a known set of properties 303. For instance, the model part 302 may be a rod of stock material that is cut to a certain length. As such, specifying the stock material and indicating specific dimensions for the model object 302 may be sufficient to communicate the set of properties 303, and it may not be necessary to state the properties of the stock material expressly when developing the model 300.

Although some model objects 302 may model raw materials or simple objects with fewer parts, other model objects 302 may also model more complex sub-assemblies. Each sub-assembly combines a plurality of parts, which act together to provide a desired set of properties. For instance, a sub-assembly may provide a motor, where the motor itself includes a plurality of different parts that work together to electromechanically drive other physical objects 22 in the physical structure 20. In this case, the set of properties for the motor may include size, shape, power output, and torque output, among other properties.

To develop the model 300, the designer also defines relationships 304 between each model object 302 and other model objects 302. The relationships 304 determine how the model objects 302 are combined. For instance, the designer may determine positions/orientations of the model objects 302 relative to other model objects 302. In addition, the designer may determine how the model objects 302 are directly or indirectly coupled to each other. Such couplings may include mechanical couplings, electrical/electronic couplings, or data communication couplings, among other possibilities. Furthermore, the designer may determine what manufacturing, assembly, or other production techniques to employ to combine the model objects 302.

The designer may further define aspects of the model 300 according to a model production site 306. The model production site 306 models external structures and conditions at the production site 26, which are relevant to producing the physical structure 20.

The designer determines relationships 308 between the model objects 302 and the model production site 306. For instance, the designer may determine positions/orientations of the model objects 302 relative to external structures in the model production site 306. In addition, the designer may determine how the model objects 302 are coupled to external structures in the model production site 306. According to one example, the model objects 302 may need to be shaped and sized so that they can be installed onto external structures in the model production site 306.

Furthermore, the designer may determine how the model objects 302 are affected by external conditions in the model production site 306. According to another example, the model objects 302 may need to be configured to withstand atmospheric conditions (e.g., heat, humidity, etc.) in the model production site 306.

The model 300 is translated into the specifications 310, which guide the production of the physical structure 20 by the robot 200 according to the designer's conception. In some cases, the designer may develop the model 300 via computer-implemented software that receives input relating to the model 300 and generates the specifications 310 for the robot 200 from this input. For instance, the input may include the definition of the model objects 302, the relationships 304 between model objects 302, and the relationships 308 between the model objects 302 and the model production site 306. The designer may employ computer-aided design (CAD) tools in the software to specify aspects of the model 300, e.g., relative position, angular offset (e.g., perpendicular, parallel), axial alignment, mating, etc., of the model objects 302.

As described above, the specifications 310 may be embodied as computer-readable program instructions stored on data storage (e.g., data storage 104) of the control system 218. The control system 218 can execute the computer-readable program instructions to operate aspects of the robot 200 to build the physical structure 20.

Accordingly, the physical objects 22, which are modeled by the model objects 302, are combined by the robot 200 to produce the physical structure 20 according to the model 300. In addition, the robot 200 produces the physical structure 20 according to external structures and conditions at the production site 26, which is modeled by the model production site 306. According to one example, the model production site 306 models an interior section of a house where housing materials are installed according to the model 300. According to another example, the model production site 306 models a municipal site where a bridge or a road is built according to the model 300.

Figure 4A:
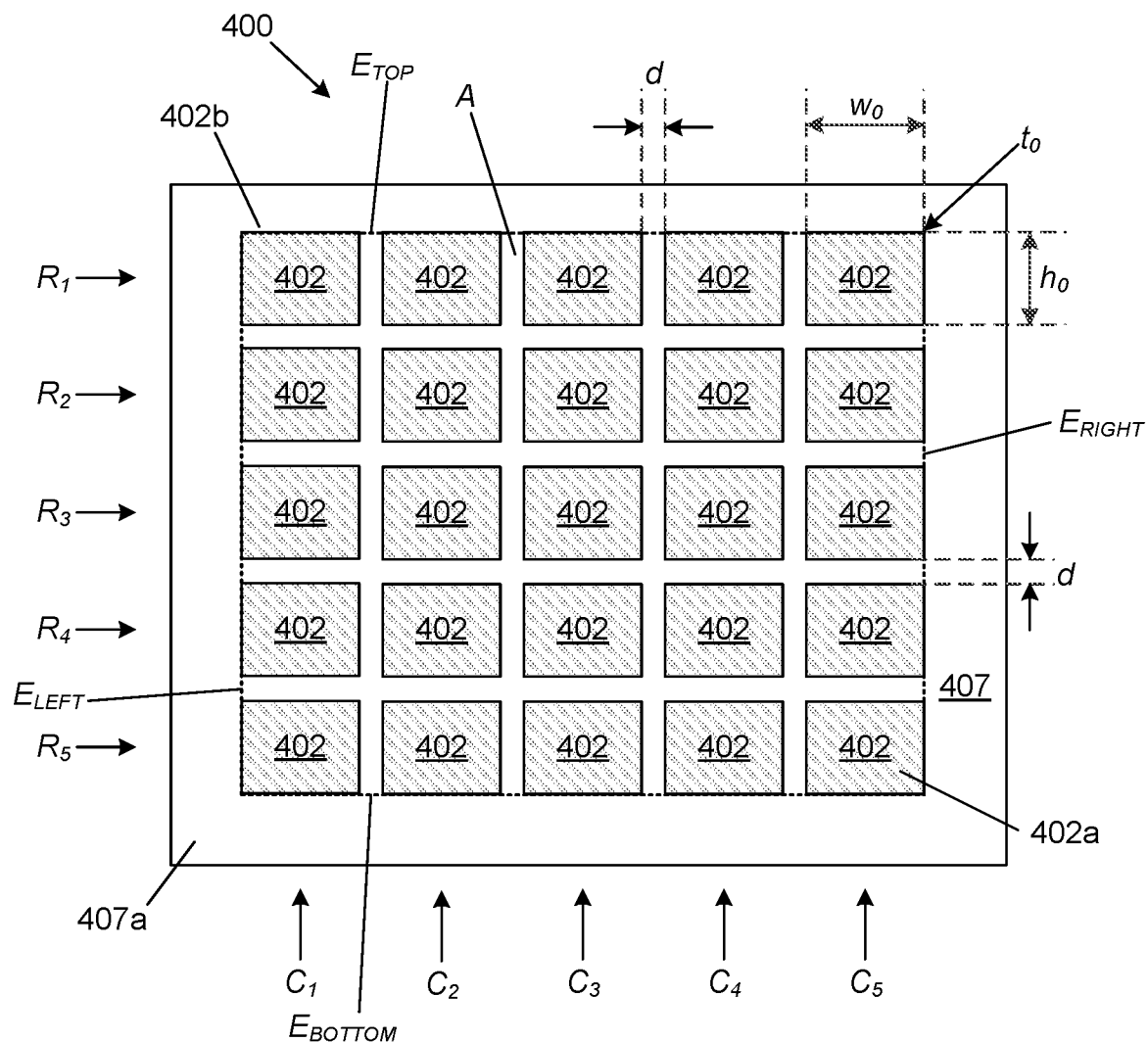
FIG. 4A illustrates an example model for installing physical tiles on a wall, according to aspects of the present disclosure.
Figure 4B:
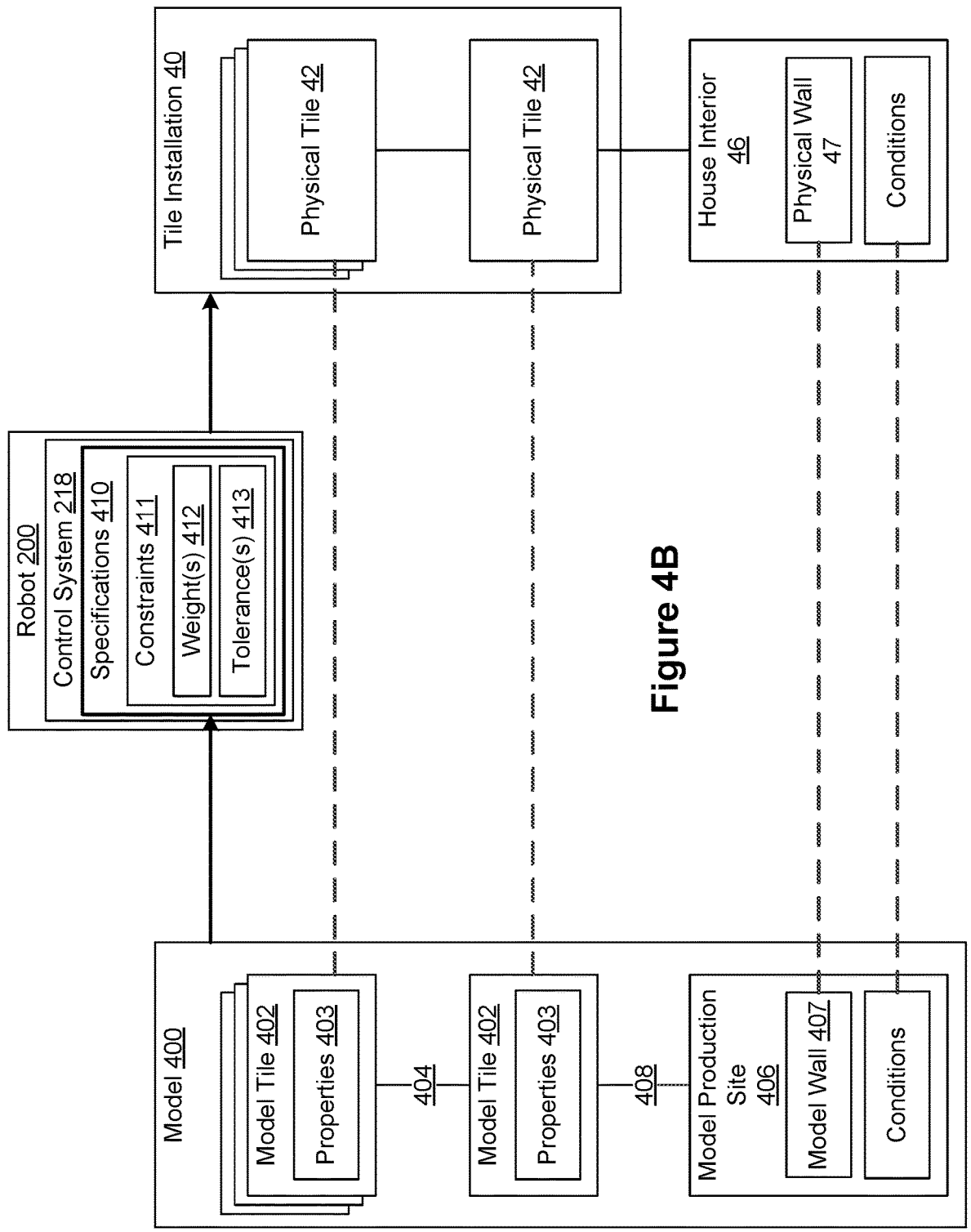
FIG. 4B illustrates an example process for generating specifications from the model of FIG. 4A and producing a tile installation from the specifications, according to aspects of the present disclosure.

FIGS. 4A-B illustrate aspects of an example model 400 for installing physical tiles 42 on a physical wall 47, as conceived by a designer. In the model 400, model tiles 402 are mounted on a model wall 407. The model tiles 402 model physical tiles 42 for producing a physical structure, i.e., a tile installation 40. Meanwhile, the model wall 407 is an external structure in a model production site 406, which for instance may model an interior 46 of a house.

The designer defines the model tiles 402 to have a desired set of properties 403. For instance, the model tiles 402 are all uniformly made from the same material as rectangular solid objects having the same height h, width w, and thickness t. Additionally, the model tiles 402 each have a vertical front surface 402a that provides desired aesthetic properties, such as surface finish(es), color(s), design pattern(s), etc.

The designer determines relationships 404 between the model tiles 402. For instance, the model tiles 402 are arranged in a pattern of five rows $R_{i=1, 2, 3, 4, 5}$ and five columns $C_{i=1, 2, 3, 4, 5}$, where each row $R_i$ has five model tiles 402 spaced uniformly apart by a distance d and each column $C_i$ includes five model tiles 402 spaced uniformly apart by the same distance d.

The designer also determines relationships 408 between the model tiles 402 and external structures and conditions of the model production site 406. The designer identifies a set of properties for the model wall 407. For instance, the model wall 407 includes a vertical front surface 407a with a rectangular area A for receiving the model tiles 402. The rectangular area A is defined by a top edge $E_{TOP}$, a bottom edge $E_{BOTTOM}$, a right edge $E_{RIGHT}$, and a left edge $E_{LEFT}$. The pattern of model tiles 402 is arranged within the rectangular area A. Furthermore, as shown in FIG. 4A, a top row $R_1$ of model tiles 402 abuts the top edge $E_{TOP}$ of the rectangular area A, a bottom row $R_5$ of model tiles 402 abuts the bottom edge $E_{BOTTOM}$ of the rectangular area A, a left column $C_1$ of model tiles 402 abuts the left edge $E_{LEFT}$ of the rectangular area A, and a right column $C_5$ of model tiles 402 abuts the right edge $E_{RIGHT}$ of the rectangular area A.

As described above, the designer may develop the model 400 via computer-implemented software that receives input relating to the model 400. For instance, the designer can employ such software to define the model tiles 402 and specify the relationships 404 between the model tiles 402 and the relationships 408 between the model tiles 402 and the production site 406.

According to the model 400, the model tiles 402 are mounted onto the front surface 407a of the model wall 407 with mortar. Each model tile 402 has a back surface 402b with a surface texture that bonds effectively with the mortar. Correspondingly, the front surface 407a has a surface texture that also bonds with the mortar. Additionally, the space d between the model tiles 402 is filled with tile grout. The conditions in the model production site 406 allow the mortar and the grout to cure properly. For instance, the atmospheric conditions in the model production site 406 provide the appropriate temperature and humidity for use of the mortar.

Accordingly, as shown in FIG. 4B, the model 400 identifies a plurality of model objects, i.e., the model tiles 402, and indicates how the plurality of model objects are combined to produce a physical structure, i.e., the tile installation 40. Furthermore, the model 400 identifies an external structure, i.e., the model wall 407, and external conditions, e.g., temperature and humidity, that are relevant to combining the model objects 402. The model 400 is translated into specifications 410, which guide the production of the tile installation 40 by the robot 200 according to the designer's conception. In particular, the specifications 410 may be embodied as computer-readable program instructions stored on data storage (e.g., data storage 104) of the control system 218.

The properties 403 of the model tiles 402, the relationships 404 between the model tiles 402, the model production site 406, and the relationships 408 between the model tiles 402 and the model production site 406 establish a variety of parameters that determine how the tile installation 40 can be produced. By providing particular values, settings, and other instructions for these parameters, the specifications 410 provide the robot 200 with guidance on the production of the tile installation 40.

The control system 218 of the robot 200 can execute the computer-readable program instructions to operate aspects of the robot 200 to build the tile installation 40. Thus, the physical tiles 42, which are modeled by the model tiles 402, are combined by the robot 200 to produce the tile installation 40 according to the model 400.

V. Example Embodiment of Robotic System for Producing a Structure

As described above with reference to FIG. 3A, a designer can develop a model 300 to provide the specifications 310 for producing the physical structure 20 with the robot 200. The model 300, though, might only reflect how the physical structure 20 will be theoretically produced by the robot 200 as conceived by the designer. For instance, the model 300 might assume that the model objects 302 are accurately positioned and oriented relative to each other. In reality, however, the production process might introduce variations or errors by positioning and orienting each physical object 22 with varying degrees of accuracy. Even if each variation/error on its own may appear to be minor, the accrual of variations/errors may prevent the production process from producing the final physical structure 20 as intended by the designer.

When developing the model 300, the designer may attempt to make the production process for the physical structure 20 more robust by providing tolerances for acceptable variations introduced by the production process. For instance, the model 300 may include tolerances for small variations in the position or orientation of each physical object 22.

Even when the robot 200 installs the physical objects 22 with variations within the tolerances, however, such variations may accumulate to create an unanticipated effect on the final physical structure 20. Furthermore, the robot 200 may install one or more of the physical objects 22 with errors outside of the tolerances. In general, the robot 200 may encounter production issues that cannot be sufficiently addressed by the tolerances.

Figure 3B:
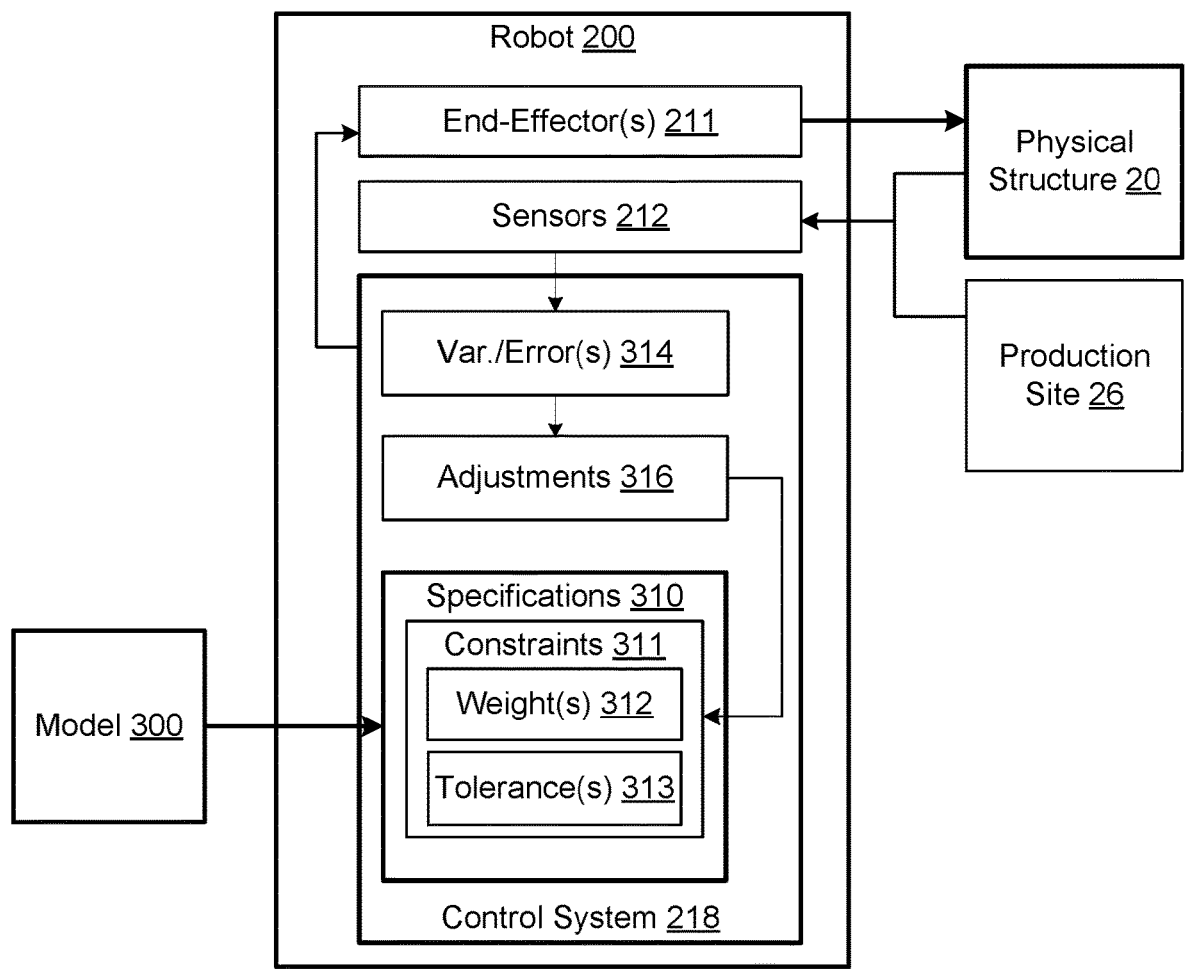
FIG. 3B illustrates further aspects of the example process of FIG. 3A, according to aspects of the present disclosure.

Advantageously, as shown in FIG. 3B, the robot 200 can continuously monitor the production process. As the robot 200 installs of each physical object 22 for instance with end-effector(s) 211, the robot 200 can employ any of the sensors 212 to measure any variations/errors 314 introduced by the installation of each physical object 22. For instance, the robot 200 can employ a 2D camera, 3D scanner, x-ray scanner, ultrasound sensor, spectral scanner, load sensors, etc., to take various measurements of aspects of the physical structure 20 and/or the production site 26. The control system 218 can use the measurements as feedback to identify any variations/errors 314. The control system 218 can then determine the effect of the variations/errors 314 on the final physical structure 20. Furthermore, the control system 218 can determine adjustments 316 for the production process to mitigate the effect of the variations/errors 314.

As shown in FIG. 3B, the adjustments 316 are applied to the specifications 310 to provide the customized production process for the physical structure 20. In general, parameters of the model 300 have modifiable values, settings, etc. As such, the specifications 310 provide a parameter space that allows for the adjustments 316. In other words, the control system 218 can determine the adjustments 316 by selecting values, settings, etc., for one or more of the parameters of the model 300 in response to the variations/errors 314. The selection of these values, settings, etc., can optimize the parameter space for the model 300. Once the control system 218 determines the adjustments 316, the control system 218 further controls the robot 200, e.g., the end-effector(s) 211, to proceed with the production process according to the adjustments 316. The robot 200 continues to monitor the production process according to the feedback loop shown in FIG. 3B. By allowing the robot 200 to respond to the effect of the variations/errors 314 on its own, the production process can continue without interruption and/or intervention by operators or the like.

Although the adjustments 316 to the production process may change aspects of the resulting physical structure 20, the robot 200 operates so that the production process preserves the intent of the designer as set forth in the model 300. In other words, the robot 200 can customize the production process to address issues in the production process while still producing a physical structure 20 generally consistent with the model 300.

When developing the model 300, the designer may define one or more constraints 311 that establish the scope of allowable adjustments 316 to the production process. In particular, the constraints 311 establish the parameter space described above and the adjustments 316 include values, settings, etc., for parameters in that space. The constraints 311 may include tolerances 313 as described above.

Furthermore, the constraints 311 provide guidance for determining the adjustments 316. The constraints 311 generally reflect the features that are most significant to the designer and indicate the designer's intent behind the model 300. In some cases, constraints 311 may also be determined according to other considerations, such as safety regulations (e.g., for the production of an airplane wing).

Referring to FIGS. 3A-B, the specifications 310 communicated to the robot 200 also include information on the constraints 311. The robot 200, via the control system 218, can evaluate the constraints 311 to determine how to customize the production process for the physical structure 20. In general, the robot 200 has the flexibility to customize the production process as long as the physical structure 20 satisfies the constraints 311.

When developing the model 300, the designer may also define weightings 312 for the constraints 311. With the weightings 312, the specifications 310 can further guide customization of the production process. The robot 200 can evaluate the weightings 312 to determine a preferred approach that yields a physical structure 24 most consistent with the designer's intent. For instance, the constraints 311 may be weighted to indicate the relative importance that the designer places on each constraint 311. The weightings 312 may indicate that some constraints 311 must necessarily be satisfied to allow the production process to proceed. Meanwhile, the weightings 312 may indicate that other constraints 312 are preferences that may be modified (or even ignored) in order to produce the desired physical structure. For instance, some constraints 312 may specify preferred values, settings, or other instructions for parameters in the production process, but if necessary, such parameters may be adjusted to respond to feedback during the production process. Furthermore, the weightings 312 may indicate the order in which modifiable constraints 311 should be modified.

As described above, the designer may develop the model 300 via computer-implemented software that receives input relating to the model 300. As such, the designer may specify the constraints 311, including the weightings 312 and the tolerances 313 via the software, which in turn generates the specifications 310, in the form of computer-readable program instructions, for the robot 200.

After evaluating a variation/error resulting from the installation of one of the physical objects 22, the robot 200 might determine that one or more constraints 311 cannot be satisfied even if the production process is modified. In such cases, the robot 200 can abort the production process. In other words, the robot 200 can make a "go/no go" decision after the installation of each physical object 22. If the robot 200 makes a "no go" decision, the robot 200 can communicate an alert, so that a user (or other system) can intervene and determine how to proceed. If possible, further information and/or instructions are communicated to the robot 200 to allow the robot 200 to proceed with the production process. For instance, one or more of the the constraints 311 may be modified for adjustments 316 to the production process.

The robot 200 may automatically document the progress of the production process as it evaluates the installation of each physical object 22 and makes adjustments 316 to address any variations/errors 314 during the installation. For instance, the robot 200 may record any measurements it makes with the sensors 212 after the installation of each physical object 22 as well as any adjustments made in response. Such documentation may be saved and/or communicated to another party or system to provide a real time (or substantially real time) log as the production process progresses. After the production process is complete, the final documentation may be employed to provide detailed information (e.g., measurements) on the entire physical structure 24 as well as a report on how the production process was adjusted in response to the variations/errors 314.

As described above, FIGS. 4A-B illustrate the example model 400 for producing the tile installation 40 (physical structure) on the wall 41 (external structure) in a house interior 46 (production site). The model 400 is translated into the specifications 410, which can guide the production of the tile installation 40 by the robot 200. As shown particularly in FIG. 4B, the specifications 410 may provide information relating to constraints 411, including weightings 412 and tolerances 413.

Figure 5A:
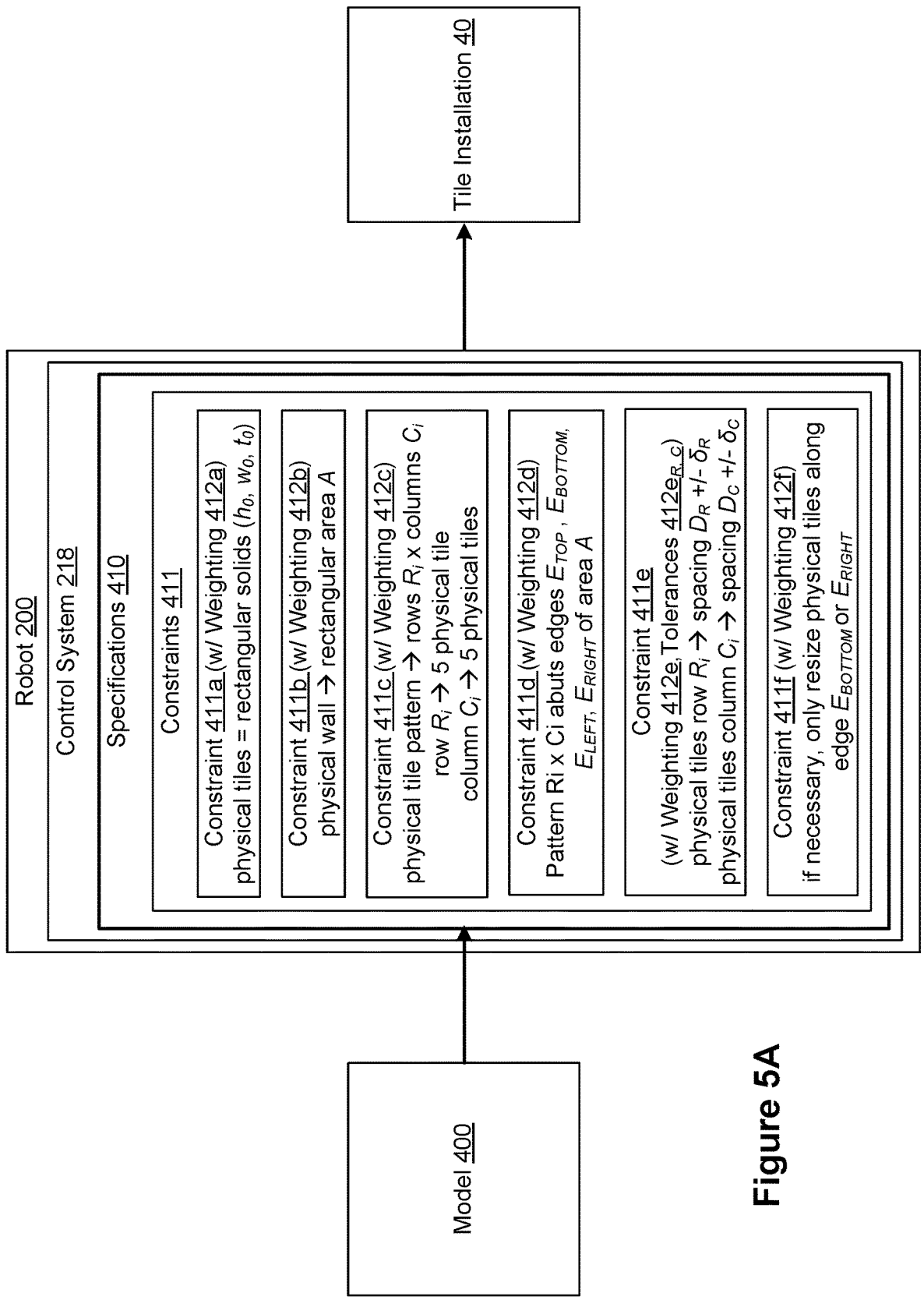
FIG. 5A illustrates example specifications, including constraints, for installing physical tiles on a wall, according to aspects of the present disclosure.

FIG. 5A illustrates example specifications 410, including information on example constraints 411a-f, based on the model 400. In particular, a first constraint 411a requires the physical tiles 42, prior to installation, to be rectangular solids with substantially the height $h_0$, the width $w_0$, and the thickness $t_0$. A second constraint 411b requires the physical wall 47 to have a front surface 47a with a rectangular area A across which the physical tiles 42 can be mounted. Additionally, a third constraint 411c requires the physical tiles 42 to be mounted according to a pattern of spaced rows $R_i$ and spaced columns $C_j$, where where each row $R_i$ has five physical tiles 42 and each column $C_i$ includes five physical tiles 42. Furthermore, a fourth constraint 411d requires the pattern of physical tiles 42 to abut a top edge $E_{TOP}$, a bottom edge $E_{BOTTOM}$, a left edge CLEFT, and a right edge $E_{RIGHT}$ of the rectangular area A.

As shown in FIG. 5A, the specifications 410 also include information on weightings 412a-d for the respective constraints 411a-d. In this particular example, the weightings 412a-d indicate the highest importance for the constraints 411a-d and require the tile installation 40 to meet the constraints 411a-d.

The specifications 410 also include information on a fifth constraint 411e. The fifth constraint 411e calls for the five physical tiles 42 of each row R to be spaced uniformly apart at a distance of $D_R$ with a tolerance 413$e_R$ of $+/-\delta_R$ and the five physical tiles 42 of each column $C_i$ to be spaced uniformly apart at a distance of $D_C$ with a tolerance 413$e_C$ of $+/-\delta_C$. The fifth constraint 411e is associated with a weighting 412e. According to the weighting 412e, the model 400 places a lower priority on the fifth constraint 411e than the constraints 411a-d. In other words, aspects of the tile installation process, if necessary, can modify the fifth constraint 411e as long as the tile installation 40 can satisfy the constraints 411a-d. Because aspects of the fifth constraint 412e are modifiable, the fifth constraint 412e defines a part of the parameter space for the model 400. Here, the modifiable parameters include the spacing between the physical tiles 42 of each row R and the spacing between the physical tiles 42 for each column $C_i$. The fifth constraint 411e specifies a preferred value of $D_R+/-\delta_R$ for the spacing in each row R and a preferred value of $D_C+/-\delta_C$ for the spacing in each row $C_i$. However, the values can be modified, if necessary, to determine adjustments 416 for the tile installation process.

In operation, the robot 200 can maneuver itself at the production site (i.e., the house interior 46) and use any of the end-effectors 211 and the sensors 212 described above to manipulate and mount the physical tiles 42 on the physical wall 47. Correspondingly, the robot 200 can employ the appropriate sensor(s) 212 (e.g., 2D camera, 3D scanner, x-ray scanner, ultrasound sensor, spectral scanner, load sensors, etc.) to measure any variation/error that may result from each mounting of the physical tiles 42. Additionally, the robot 200, via the control system 218, can determine whether the constraints 411 can still be satisfied. If necessary, the robot 200 can determine, via the control system 218, what aspects of the tile installation process may need to be allowably modified to respond to the variation/error. Aspects of the feedback loop shown in FIG. 3B apply to this example.

Figure 5B:
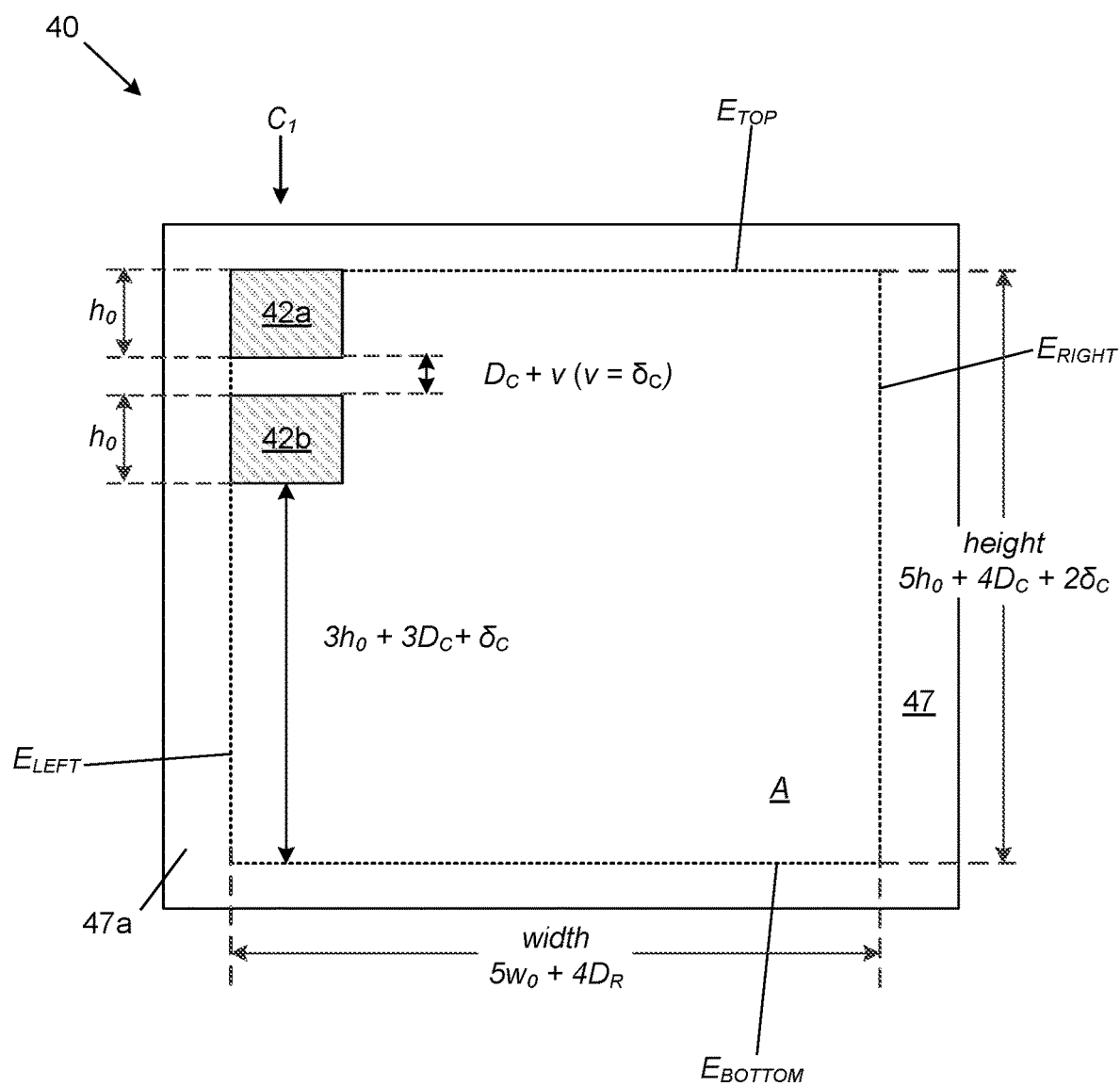
FIG. 5B illustrates a step during an example production process employing the example specifications of FIG. 5A, according to aspects of the present disclosure.
Figure 5C:
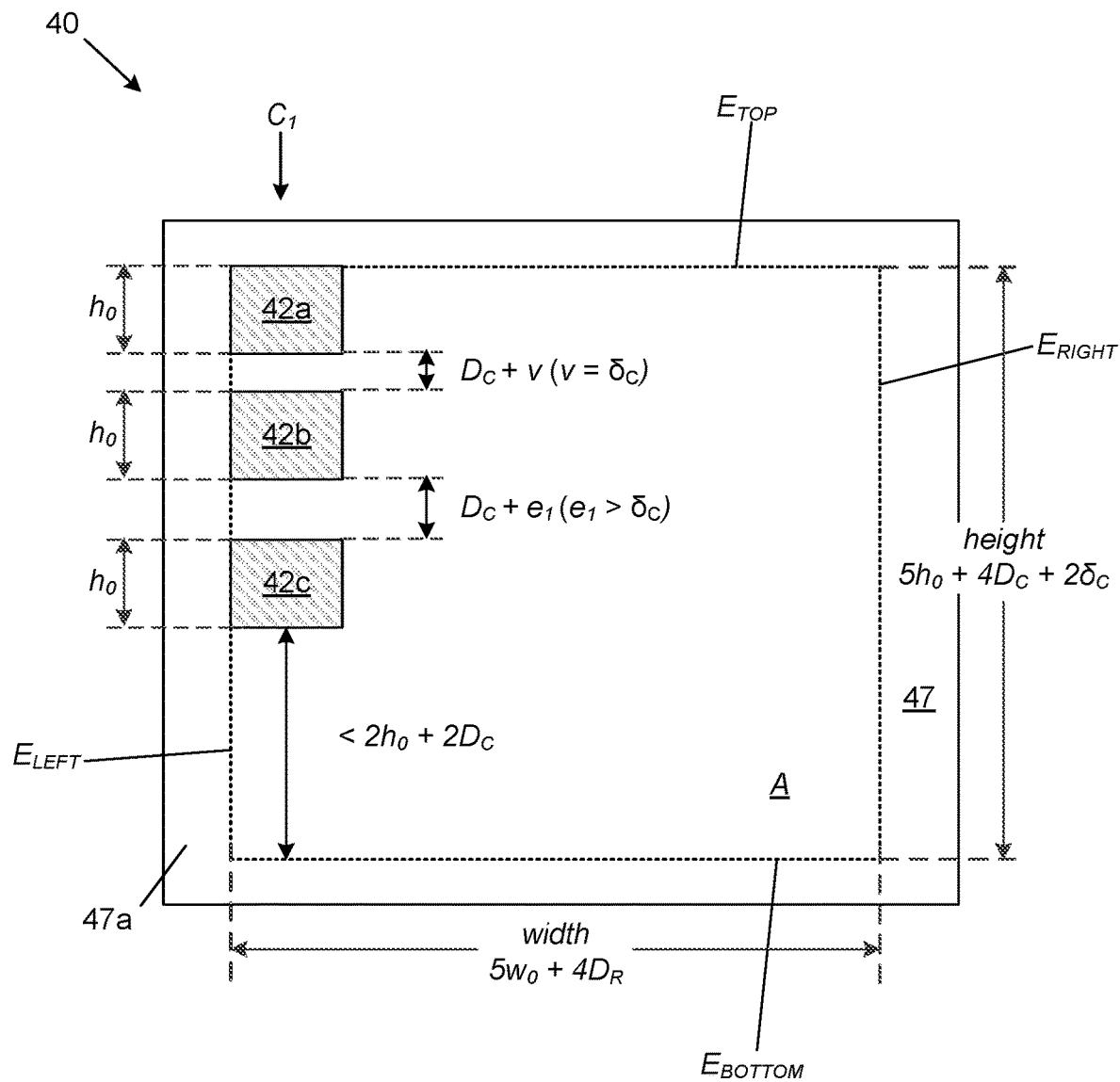
FIG. 5C illustrates another step during the example production process of FIG. 5B, according to aspects of the present disclosure.
Figure 5D:
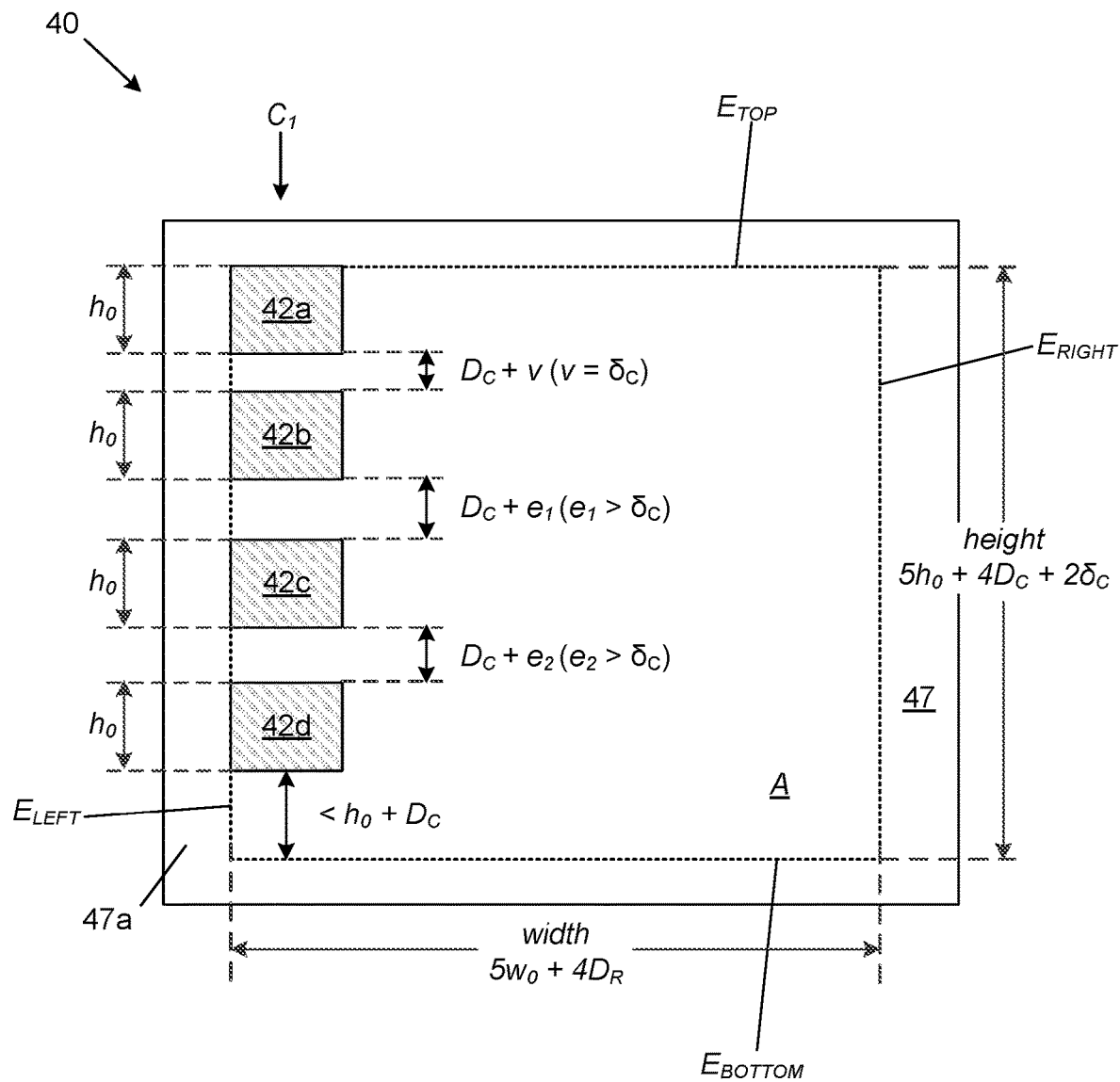
FIG. 5D illustrates yet another step during the example production process of FIG. 5B, according to aspects of the present disclosure.

FIGS. 5B-D illustrate example steps in a process for producing the tile installation 40 according to the specifications 410. Prior to installing the physical tiles 42, the robot 200 employs the appropriate sensor(s) 212 to measure the physical tiles 42 as well as the rectangular area A of the wall 47. In this example, the physical tiles 42 are all rectangular solids with substantially the height $h_0$, the width $w_0$, and the thickness $t_0$. Additionally, the rectangular area A has a height of $5h_0+4D_C+2\delta_C$ and a width of $5w_0+4D_R$.

As shown in FIG. 5B, the robot 200 mounts a second physical tile 42b on the physical wall 47 after the installation of a first physical tile 42a. The physical tiles 42a, b are aligned to form part of a left column $C_1$. After mounting the second tile 42b, the robot 200 employs the appropriate sensor(s) 212 to measure the spacing between the first physical tile 42a and the second physical tile 42b. The second physical tile 42b is mounted a distance of $D_C+v$ below the first physical tile 42a. In this case, the value of v happens to be equal to $\delta_C$, which corresponds to the tolerance 413$e_C$ provided by the fifth constraint 411e. As such, the value of v falls within a variation anticipated by the designer for the mounting of the physical tiles 42. (To simplify this discussion, the value of the variation v here equals $\delta_C$, but in other cases, the value of v may be less than $\delta_C$.)

Using the spacing measurement obtained by the robot 200, the control system 218 evaluates whether three additional physical tiles 42 can be mounted below the second physical tile 42b, where the left column $C_1$ abuts the bottom edge $E_{BOTTOM}$ of the rectangular area A according to the fourth constraint 411d.

The first physical tile 42a and the second physical tile 42b combine for a height of $2h_0+D_C+v=2h_0+D_C+\delta_C$. As the rectangular area A has a height of $5h_0+4D_C+2\delta_C$, the rectangular area A provides a further $3h_0+3D_C+\delta_C$ to accommodate three additional physical tiles 42 to complete the left column $C_1$. Even with the variation v in the spacing between the first physical tile 42a and the second physical tile 42b, the control system 218 determines that the height of the rectangular area A is sufficient to allow the mounting of the three additional physical tiles 42. Thus, the control system 218 determines that the robot 200 can proceed with the tile installation process and still satisfy the constraints 411a-e without any adjustments 416 at this stage.

As shown in FIG. 5C, the robot 200 mounts a third physical tile 42c on the physical wall 47 after the installation of the physical tiles 42a, 42b. The physical tile 42c is aligned with the physical tiles 42a-b to form part of the left column $C_1$. After mounting the third physical tile 42c, the robot 200 employs the appropriate sensor(s) 212 to measure the spacing between the second physical tile 42b and the third physical tile 42c. Although the robot 200 attempts to mount the physical tiles 42 as precisely as possible according to the constraint 511e, the third physical tile 42c is mounted with at a distance of $D_C+e_1$ below the second physical tile 42b, where $e_1$ is an error. In this case, the value of error $e_1$ is greater than $\delta_C$, which corresponds to the tolerance 413$e_C$ provided by the fifth constraint 411e. As such, the value of $e_1$ falls outside a variation anticipated by the designer for the mounting of the physical tiles 42. Because the distance $D_C+e_1$ is greater than the $D_C+\delta_C$, the mounting of the third physical tile 42c does not satisfy the fifth constraint 411e. The weighting 412e for the fifth constraint 411e, however, indicates that the parameters of the fifth constraint 411e, i.e., the spacing between the tiles, may be modified for the mounting of the third physical tile 42c to allow the tile installation process to proceed despite the error $e_1$.

Using the spacing measurement obtained by the robot 200, the control system 218 also evaluates whether two additional physical tiles 42 can still be mounted to complete the left column $C_1$, where the left column $C_1$ abuts the bottom edge $E_{BOTTOM}$ of the rectangular area A according to the fourth constraint 411d. The physical tiles 42a-c combine for a height of $3h_0+2D_C+v+e_1$, which is greater than $3h_0+$ $2D_C+2\delta_C$. As the rectangular area A has a height of $5h_0+4D_C+2\delta_C$, the rectangular area A provides less than $2h_0+2D_C$ to accommodate two additional physical tiles 42 to complete the left column $C_1$. Thus, the control system 218 determines that the remaining space in the rectangular area A is now insufficient to allow the mounting of the two additional physical tiles 42$d$, $e$ (with the height $h_0$) while also satisfying the constraints 411$a$-$e$, as such mounting requires a distance of at least $2h_0+2D_C$.

As described above, the parameters of the fifth constraint 411$e$, i.e., the spacing between the tiles, may be modified for adjustments 316 to the tile installation process. Therefore, in response to the error $e_1$ as well as the variation v, the control system 218 may adjust the spacings between the third physical tile 42$c$ and the two subsequent physical tiles 42$d$, $e$. In particular, the mounting of physical tiles 42$d$, $e$ requires $2h_0$. Assuming that the rectangular area A provides at least $2h_0$ after the third physical tile 42$c$ is mounted, the control system 218 may determine that the remaining space (less than $2D_C$) can be divided evenly for: (i) the spacing between the third physical tile 42$c$ and the fourth physical tile 42$d$, and (ii) the spacing between the fourth physical tile 42$d$ and the fifth physical tile 42$e$.

If, however, the rectangular area A does not provide at least $2h_0$ after the third physical tile 42$c$ is mounted, the control system 218 determines that two additional tiles 42 cannot be mounted according to the requirements of the third constraint 411$c$. Thus, the control system 218 can decide to abort the tile installation process after the installation of the third physical tile 42$c$. Advantageously, the robot 200 aborts the tile installation process before additional resources are wasted in the production of an unwanted tile installation. With this decision, the control system 218 can communicate an alert, so that a user (or other system) can intervene and determine how to proceed.

Each time the control system 218 receives feedback from the sensors 212, the control system 218 can respond to any variations/errors by (re)evaluating and adjusting the values, settings, etc., for the entire parameter space defined by the model 400. For instance, the adjustments 416 after the mounting of a particular physical tile 42 may yield a set of spacings for the physical tiles 42 yet to be mounted, but once the subsequent physical tile 42 is mounted, the control system 218 may determine, due to the introduction of further variations/errors, further adjustments 416 that yield a different set of spacings for the physical tiles 42 yet to be mounted.

As shown in FIG. 5A, the specifications 410 include a sixth constraint 411$f$ which provides that some of the physical tiles 42, if necessary, can be resized to fit the tile installation 40 into the remaining space provided by the rectangular area A. Furthermore, the sixth constraint 411$f$ may have a weighting 412$f$ that indicates that the sixth constraint 411$f$ has a lower priority than the first through fourth constraints 411$a$-$d$, but a higher priority than the fifth constraint 411$e$. Thus, the sixth constraint 411$f$ is only followed in certain scenarios, i.e., when resizing of tiles is required to complete the tile installation 40. Additionally, instead of adjusting the physical tiles 42 based on the fifth constraint 411$e$, the control system 218 adjusts the tile installation process by resizing the physical tiles 42.

The sixth constraint 411$f$ also provides that, if necessary, only the physical tiles 42 extending along the bottom edge $E_{BOTTOM}$ or the right edge $E_{RIGHT}$ should be resized. In other words, the designer may intend to maintain the physical tiles 42 at their initial dimensions $h_0$, $w_0$, $t_0$ as much as possible. Because aspects of the sixth constraint 411$f$ are modifiable, the sixth constraint 411$f$ also defines a part of the parameter space for the model 400. Here, the modifiable parameters include the size of the physical tiles 42 extending along the bottom edge $E_{BOTTOM}$ or the right edge $E_{RIGHT}$. The sizes can be modified, if necessary, to determine adjustments 416 for the tile installation process.

Accordingly, as shown in FIG. 5D, the robot 200 mounts the fourth physical tile 42$d$ without any resizing. As described above, after the fourth physical tile 42$d$ is mounted, the control system 218 can re-evaluate and adjust the values, settings, etc., for the entire parameter space defined by the model 400. After mounting the fourth physical tile 42$d$, the robot 200 employs the appropriate sensor(s) 212 to measure the spacing between the third physical tile 42$c$ and the fourth physical tile 42$d$. The fourth physical tile 42$d$, however, is mounted with another error $e_2$ and is spaced a distance of $D_C+e_2$ below the third physical tile 42$c$.

Figure 5E:
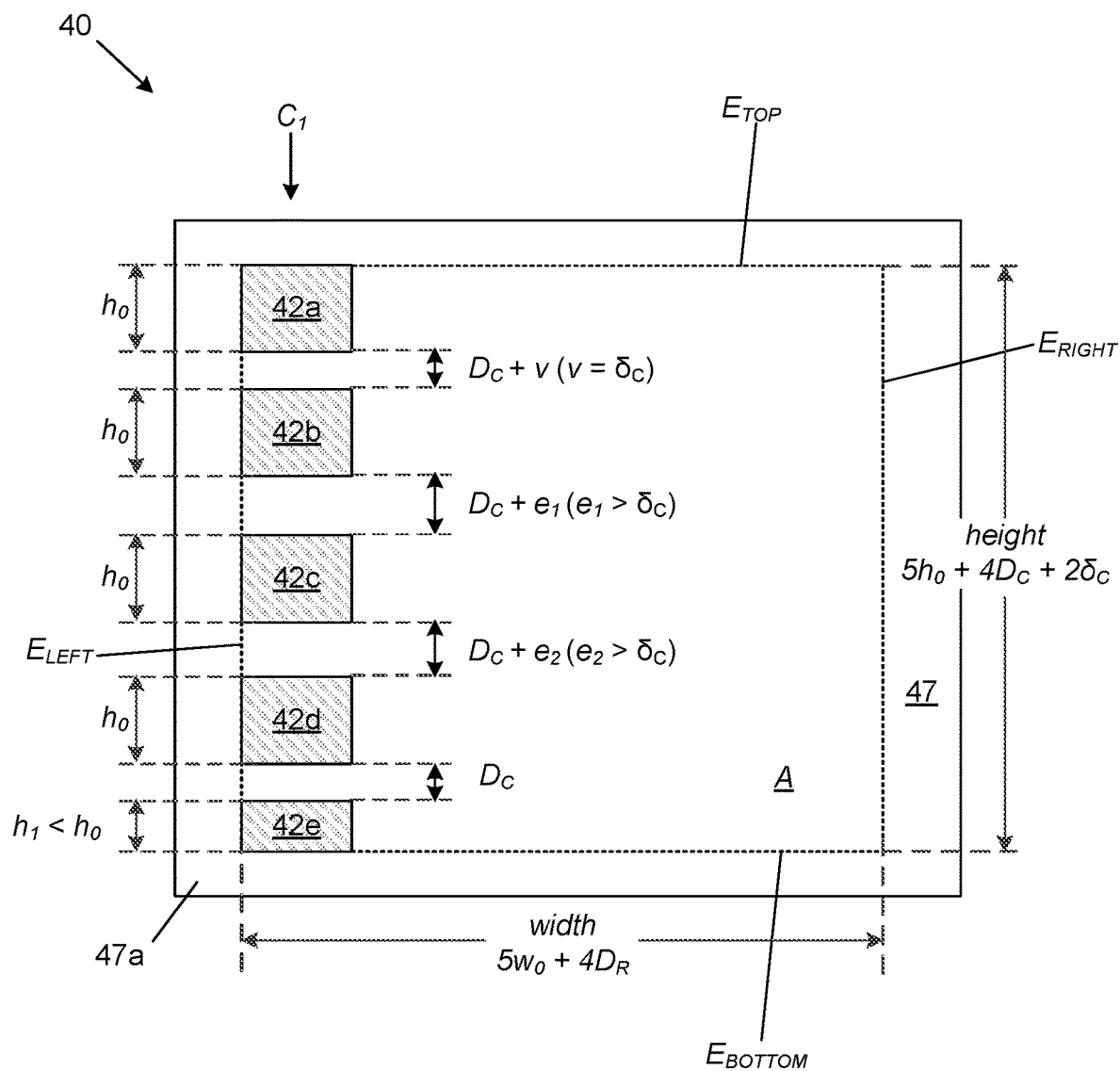
FIG. 5E illustrates a further step during the example production process of FIG. 5B, according to aspects of the present disclosure.

After the robot 200 measures this spacing, the control system 218 determines that the fifth physical tile must be resized further to accommodate the error $e_2$ in addition to the error $e_1$. The physical tiles 42$a$-$d$ combine for a height of $4h_0+3D_C+v+e_1+e_2$. Thus, the robot 200 can employ the appropriate end-effector(s) 211 to resize the fifth physical tile 42$e$ to a reduced height hi so that the left column $C_1$ fits in the rectangular area A. As shown in FIG. 5E, the fifth physical tile 42$e$ is mounted at a distance $D_C$ under the fourth physical tile 42$d$ with this reduced height hi to complete the left column $C_1$. The remaining columns $C_i$ and the rows $R_i$ can be similarly completed with the physical tiles 42.

Ideally, the robot 400 produces a tile installation 40 that closely resembles the model 400 as initially conceived by the designer (shown in FIG. 4A). Aspects of the production process, however, may not be consistent with some of the assumptions behind the model. For instance, the rectangular area A of the wall 47 above might be slightly smaller than the model 400 anticipates.

Furthermore, the robot 200 might mount the physical tiles 42 with unanticipated errors. As shown in the example of FIGS. 5A-E, such errors (e.g., errors $e_1$ and $e_2$) as well as variations within set tolerances (e.g., variation v) can accumulate during the tile installation process and affect the resulting tile installation 40. Advantageously, the robot 200 can monitor each step of the tile installation process. In particular, the robot 200 can take various measurements of various aspects of the tile installation in the three-dimensional space of the installation site. By evaluating the measurements at each step, the robot 200 dynamically determines how to mitigate the effect of any variations/errors that may be introduced at each step.

In some cases, the robot 200 may decide to abort the tile production process. In other cases, the robot 200 can adjust the tile production process as provided by the specifications 410. The constraints 411$a$-$f$ in FIG. 5A reflect the designer's intent while also defining a dynamic design space where parameters in the tile installation process can be dynamically modified to accommodate errors that may occur. In particular, the robot 200 can resize (e.g., cut) the physical tiles 42 to accommodate any errors as each physical tile 42 is mounted. Although the tile installation 40 may differ in some aspects from the model 400 shown in FIG. 4A, the tile installation 40 still preserves the designer's intent as defined by the constraints 411$a$-$f$.

VI. Additional Example of a Structure Produced by a Robotic System

The example of FIGS. 5A-D is only one example of how the robot 200 can adjust parameters to customize a production process in response to sensor data from the sensors 212. For instance, the robot 200 can install heavy construction materials to build a bridge, where the robot 200 takes measurements after each installation step and responds to variations/errors by deciding to abort or modifying the bridge installation process.

Figure 6:
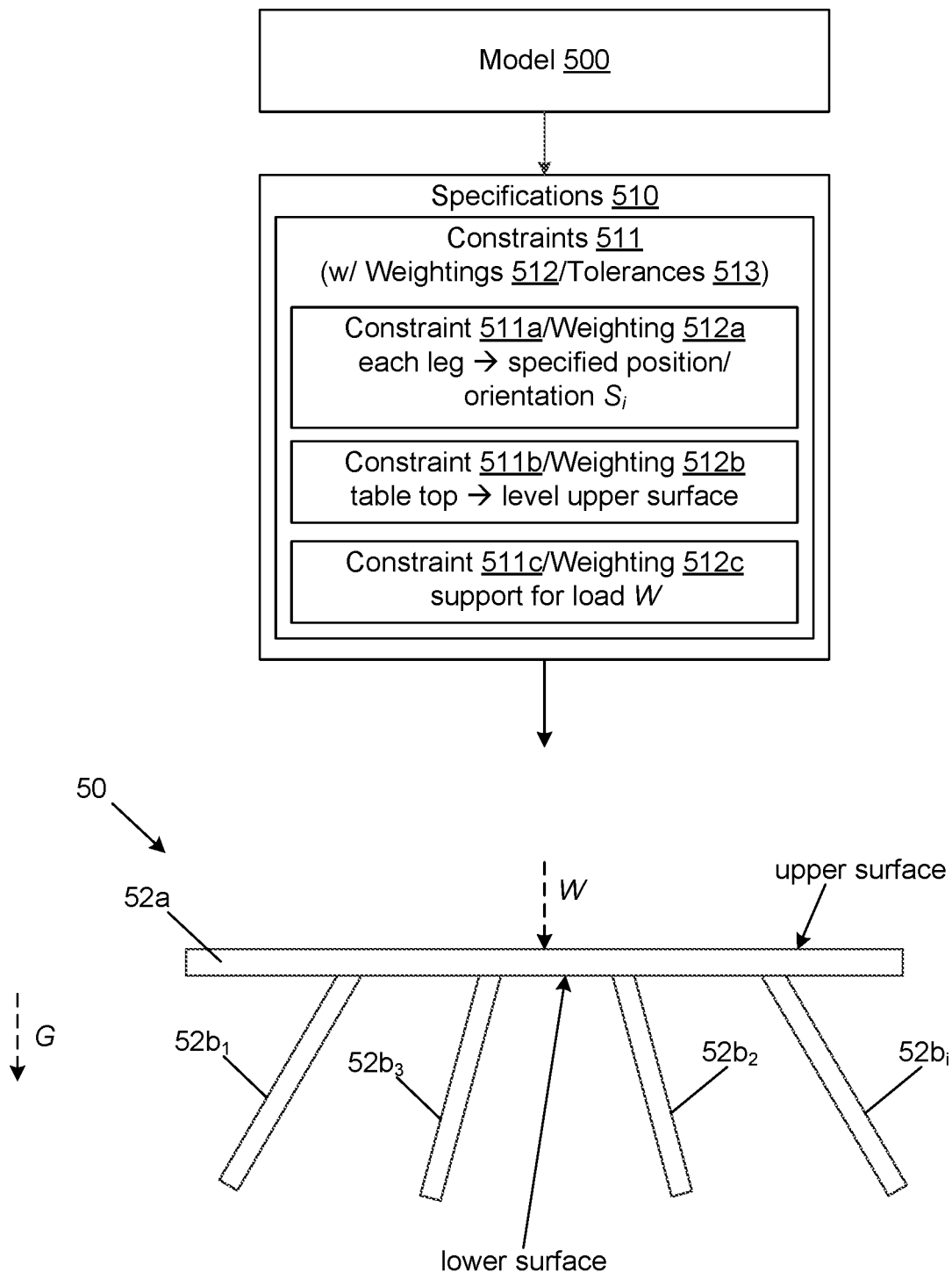
FIG. 6 illustrates aspects of another example production process for a table, according to aspects of the present disclosure.

FIG. 6 illustrates aspects of another example production process for a table 50. The table 50 is assembled from a table top 52a and n legs $52b_{i=1,\ldots,n}$ according to specifications 510 generated from a model 500.

The specifications 510 include constraints 511 and respective weightings 512 and tolerances 513. A first constraint 511a and a respective weighing 512a requires that each leg $52b_i$ be attached to the lower surface of the table top 52a at a respective specified position/orientation $S_i$. A second constraint 511b and a respective weighing 512b requires the upper horizontal surface of the table top 52a to remain level, i.e., generally perpendicular to gravitational force G. A third constraint 511c and a respective weighing 512c requires the table 50 to support a minimum load (i.e., weight) W acting downwardly at the center of the table top 52a. The constraints 511a-c may also specify certain respective tolerances 513.

Using the appropriate end-effector(s) 212, the robot 200 attaches a first leg $52b_1$ to the lower surface of the table top 52a with fasteners, adhesives, welding, mechanical/frictional engagement, and/or other appropriate techniques. Using the appropriate sensor(s) 212, the robot 200 can obtain a measurement $M_1$ of the position/orientation of the first leg $52b_1$ relative to the table top 52a.

If the control system 218 detects a variation or error between the measured position/orientation $M_1$ and the specified position/orientation $S_1$, the control system 218 can evaluate the effect of the variation/error on the production process. In particular, the control system 218 can determine whether each remaining leg $52b_{i=2,\ldots,n}$ can be attached at its specified position/orientation $S_{i=2,\ldots,n}$, while still keeping the table top 52a level according to the second constraint 511b and allowing the table 50 to support the minimum load W according to the third constraint 511c. To make such a determination, the control system 218 can run a geometric simulation that predicts the resulting geometry of the table 50 based on attaching the first leg $52b_1$ at the measured position/orientation $M_1$ and attaching each remaining legs $52b_{i=2,\ldots,n}$ at its specified position/orientation $S_{i=2,\ldots,n}$. In addition, the control system 218 can run a mechanical (e.g., statics) simulation to determine the effect of a load W on the resulting geometry of the table 50.

If the control system 218 determines that the second and third constraints 511b, c can be satisfied with the measured position/orientation $M_1$ of the first leg $52b_1$, the robot 200 can proceed with the production process by attaching the second leg 52b2 according to its specified position/orientation $S_2$ and so on.

If the control system 218, however, determines that second and third constraints 511b, c cannot be satisfied with the measured position/orientation $M_1$ of the first leg $52b_1$, the control system 218 can attempt to address the variation or error associated with the first leg $52b_i$ by adjusting the position/orientation at which the second leg 52b2 and/or subsequent legs $52b_{i=3,\ldots,n}$ are attached to the table top 52a. If possible, the robot 200 proceeds with such adjustments to the production process to produce the table 50. Otherwise, the robot 200 can abort the production process and communicate an alert, so that a user (or other system) can intervene and determine how to proceed.

In general, after the attachment of each leg $52b_i$, the robot 200 measures the position/orientation of the attached leg $52b_i$. Using the measurements, the control system 218 can evaluate whether attaching the remaining legs $52b_{i+1,\ldots,n}$ according to the specifications 510 will yield a table top 52a that is level and a table 50 that can support the minimum load W. If necessary, the control system 218 can adjust how the remaining legs $52b_{i+1,\ldots,n}$ should be attached in order to produce the desired table 50. A similar approach can be employed for other types of physical structures.

VII. Conclusion

A robot can use end-effector(s) and sensor(s) to combine a plurality of physical objects into a desired physical structure. To produce this physical structure, the robot may be guided by specifications that are generated from a model for the physical structure. In view of the foregoing, a robot can dynamically adjust aspects of a production process to account for differences between the model and physical reality. Specifically, the robot can employ sensors to take measurements after each step in the production process. Using these measurements, the robot can evaluate whether the production process will produce the desired physical structure. The specifications derived from the model provide the robot with the necessary flexibility to customize the production process so that the desired physical structure is produced. The specifications define a flexible design space where different parameters in the production process can be modified to accommodate physical reality. Although the adjustments to the production process may change aspects of the resulting physical structure, the robot operates so that the production process preserves the intent of the designer provided in the model.

The above detailed description describes various features and functions of the disclosed systems, devices, and methods with reference to the accompanying figures. In the figures, similar symbols typically identify similar components, unless context indicates otherwise. The illustrative implementations described in the detailed description, figures, and claims are not meant to be limiting. Other implementations can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example implementations. Alternative implementations are included within the scope of these example implementations. In these alternative implementations, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

A computer-readable medium may include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

What is claimed is:

1. A computer-implemented method comprising:
   determining that, in a present form of a physical structure that a robot is producing in accordance with a production process, an effect of variations that (i) were individually introduced during completed steps of the production process and (ii) were individually determined to be acceptable, have accumulated to such an unanticipated extent that an overall accumulated variation on the present form of the physical structure as a whole has exceeded one or more predefined tolerances;
   accessing a model that specifies multiple design constraints that are each associated with a different candidate adjustment to the production process that is for mitigating the overall accumulated variation on the present form of the physical structure as a whole, wherein the model orders each of the multiple design constraints according to relative priority;
   selecting, from among the multiple design constraints that are each associated with a different candidate adjustment to the production process, a particular design constraint having a highest order according to the model;
   adjusting the production process according to the adjustment to the production process that is associated with the particular design constraint; and
   instructing the robot to continue to produce the physical structure from the present form, in accordance with the adjusted production process.

2. The method of claim 1, wherein the accumulated variation is measured using one or more sensors that are associated with the robot.

3. The method of claim 1, comprising:
   before the particular design constraint is selected, determining that it is possible to mitigate the accumulated variation after the production process is adjusted using any one or more of the different candidate adjustments,
   wherein the particular design constraint is selected only after determining that it is possible to mitigate the accumulated variation after the production process is adjusted using the any one or more of the different candidate adjustments.

4. The method of claim 1, wherein adjusting the production process comprises adjusting an object spacing parameter that is specified by the un-adjusted production process.

5. The method of claim 1, wherein adjusting the production process comprises resizing an object that is specified by the un-adjusted production process.

6. The method of claim 1, wherein the model orders each of the multiple design constraints based on a respective weight that is assigned to each design constraint.

7. The method of claim 6, wherein selecting, from among the multiple candidate adjustments to the design process comprises:
   evaluating the weights that are assigned to the set of design constraints to select a particular constraint that is indicated as having a highest importance.

8. The method of claim 1, wherein the model ranks each of the multiple design constraints according to a consistency of the respective design constraints with an original design intent as indicated by a designer of the physical structure.

9. A system comprising one or more computers and one or more storage devices storing instructions that are operable, when executed by the one or more computers, to cause the one or more computers to perform operations comprising:
   determining that, in a present form of a physical structure that a robot is producing in accordance with a production process, an effect of variations that (i) were individually introduced during completed steps of the production process and (ii) were individually determined to be acceptable, have accumulated to such an unanticipated extent that an overall accumulated variation on the present form of the physical structure as a whole has exceeded one or more predefined tolerances;
   accessing a model that specifies multiple design constraints that are each associated with a different candidate adjustment to the production process that is for mitigating the overall accumulated variation on the present form of the physical structure as a whole, wherein the model orders each of the multiple design constraints according to relative priority;
   selecting, from among the multiple design constraints that are each associated with a different candidate adjustment to the production process, a particular design constraint having a highest order according to the model;
   adjusting the production process according to the adjustment to the production process that is associated with the particular design constraint; and
   instructing the robot to continue to produce the physical structure from the present form, in accordance with the adjusted production process.

10. The system of claim 9, wherein the accumulated variation is measured using one or more sensors that are associated with the robot.

11. The system of claim 9, wherein the operations comprise:
before the particular design constraint is selected, determining that it is possible to mitigate the accumulated variation after the production process is adjusted using any one or more of the different candidate adjustments, wherein the particular design constraint is selected only after determining that it is possible to mitigate the accumulated variation after the production process is adjusted using the any one or more of the different candidate adjustments.

12. The system of claim 9, wherein adjusting the production process comprises adjusting an object spacing parameter that is specified by the un-adjusted production process.

13. The system of claim 9, wherein adjusting the production process comprises resizing an object that is specified by the un-adjusted production process.

14. The system of claim 9, wherein the model orders each of the multiple design constraints based on a respective weight that is assigned to each design constraint.

15. The system of claim 14, wherein selecting, from among the multiple candidate adjustments to the design process comprises:
evaluating the weights that are assigned to the set of design constraints to select a particular constraint that is indicated as having a highest importance.

16. The system of claim 9, wherein the model ranks each of the multiple design constraints according to a consistency of the respective design constraints with an original design intent as indicated by a designer of the physical structure.

17. A non-transitory computer-readable storage device storing software comprising instructions executable by one or more computers which, upon such execution, cause the one or more computers to perform operations comprising:
determining that, in a present form of a physical structure that a robot is producing in accordance with a production process, an effect of variations that (i) were individually introduced during completed steps of the production process and (ii) were individually determined to be acceptable, have accumulated to such an unanticipated extent that an overall accumulated variation on the present form of the physical structure as a whole has exceeded one or more predefined tolerances;
accessing a model that specifies multiple design constraints that are each associated with a different candidate adjustment to the production process that is for mitigating the overall accumulated variation on the present form of the physical structure as a whole, wherein the model orders each of the multiple design constraints according to relative priority;
selecting, from among the multiple design constraints that are each associated with a different candidate adjustment to the production process, a particular design constraint having a highest order according to the model;
adjusting the production process according to the adjustment to the production process that is associated with the particular design constraint; and
instructing the robot to continue to produce the physical structure from the present form, in accordance with the adjusted production process.

18. The device of claim 17, wherein the accumulated variation is measured using one or more sensors that are associated with the robot.

19. The device of claim 17, wherein the operations comprise:
before the particular design constraint is selected, determining that it is possible to mitigate the accumulated variation after the production process is adjusted using any one or more of the different candidate adjustments, wherein the particular design constraint is selected only after determining that it is possible to mitigate the accumulated variation after the production process is adjusted using the any one or more of the different candidate adjustments.

20. The device of claim 17, wherein adjusting the production process comprises adjusting an object spacing parameter that is specified by the un-adjusted production process.

* * * * *